[12] United States Patent
Hosseini et al.

(10) Patent No.: US 10,992,408 B2
(45) Date of Patent: Apr. 27, 2021

(54) TRANSPORT BLOCK SIZE SCALING FACTOR INDICATION FOR ULTRA-RELIABLE LOW-LATENCY COMMUNICATION

(71) Applicant: QUALCOMM Incorporated, San Diego, CA (US)

(72) Inventors: Seyedkianoush Hosseini, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 16/406,391

(22) Filed: May 8, 2019

(65) Prior Publication Data
US 2019/0349116 A1    Nov. 14, 2019

Related U.S. Application Data

(60) Provisional application No. 62/670,390, filed on May 11, 2018.

(51) Int. Cl.
*H04L 1/00* (2006.01)
*H04L 1/18* (2006.01)
*H04W 72/04* (2009.01)

(52) U.S. Cl.
CPC .......... *H04L 1/0007* (2013.01); *H04L 1/0003* (2013.01); *H04L 1/0009* (2013.01);
(Continued)

(58) Field of Classification Search
CPC ... H04L 1/0007; H04L 1/0003; H04L 1/0009; H04L 1/0016; H04L 1/1893; H04W 72/042
(Continued)

(56) References Cited

U.S. PATENT DOCUMENTS 9,844,072 B2 * 12/2017 Chen et al.
9,955,462 B2 *  4/2018 Chen et al.
(Continued)

OTHER PUBLICATIONS

International Search Report and Written Opinion—PCT/US2019/031592—ISA/EPO—dated Oct. 31, 2019.
(Continued)

*Primary Examiner* — John J Tabone, Jr.
(74) *Attorney, Agent, or Firm* — Holland & Hart LLP

(57) ABSTRACT

Methods, systems, and devices for wireless communications are described. Some wireless communications systems may implement reliability thresholds for transmissions. Base stations and user equipment (UEs) may implement techniques to reduce coding rates in order to improve reliability. For example, a base station may dynamically indicate a UE-specific transport block size (TBS) scaling factor for communication. The base station may include an explicit TBS scaling factor indicator in a downlink transmission, an implicit indication of the TBS scaling factor based on an indicated mode of operation (for example, a repetition mode) for the UE, or a combination thereof. By dynamically selecting between different supported scaling factors, the wireless devices may implement TBS scaling factors that are non-proportional to resource scaling factors, resulting in lower coding rates. For example, the wireless devices may utilize lower scaling factors for repetition-based transmissions than single transmissions to improve the reliability of the repeated transmissions.

24 Claims, 18 Drawing Sheets

(52) U.S. Cl.
CPC .......... *H04L 1/0016* (2013.01); *H04L 1/1893* (2013.01); *H04W 72/042* (2013.01)

(58) Field of Classification Search
USPC .......................... 714/748, 750, 821; 370/329
See application file for complete search history.

(56) References Cited

U.S. PATENT DOCUMENTS

| | | | |
|---|---|---|---|
| 9,980,257 | B2* | 5/2018 | Chen et al. |
| 10,631,284 | B2* | 4/2020 | Wikstrom et al. |
| 2012/0163319 | A1* | 6/2012 | Roessel et al. |
| 2016/0095104 | A1* | 3/2016 | Chen et al. |
| 2016/0095105 | A1* | 3/2016 | Chen et al. |
| 2016/0095137 | A1* | 3/2016 | Chen et al. |
| 2018/0102890 | A1* | 4/2018 | Yi et al. |
| 2018/0227944 | A1* | 8/2018 | Yerramalli et al. |
| 2018/0249370 | A1* | 8/2018 | Zhang et al. |
| 2019/0200330 | A1* | 6/2019 | Wikstrom et al. |
| 2019/0253229 | A1* | 8/2019 | Hosseini et al. |

OTHER PUBLICATIONS

Partial International Search Report—PCT/US2019/031592—ISA/EPO—dated Sep. 4, 2019.

\* cited by examiner

TRANSPORT BLOCK SIZE SCALING FACTOR INDICATION FOR ULTRA-RELIABLE LOW-LATENCY COMMUNICATION

CROSS REFERENCES

The present Application for Patent claims the benefit of U.S. Provisional Patent Application No. 62/670,390 by Hosseini, et al., entitled "TRANSPORT BLOCK SIZE SCALING FACTOR INDICATION FOR ULTRA-RELIABLE LOW-LATENCY COMMUNICATION," filed May 11, 2018, assigned to the assignee hereof, and expressly incorporated by reference herein.

BACKGROUND

The following relates generally to wireless communications, and more specifically to transport block size (TBS) scaling factor indication for ultra-reliable low-latency communication (URLLC).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some wireless communications systems may implement latency requirements, reliability requirements, or both for transmissions between devices. For example, one such set of requirements may specify that end-to-end (E2E) communications within a wireless communications system have no more than a 1 millisecond (ms) delay with a reliability of at least 1 e-5. The reliability may be measured in terms of a block error rate (BLER) for a communication link. The achievable BLER for a link may decrease as the coding rate for transmission is reduced. Accordingly, to meet the reliability requirements, some wireless devices may need to reduce the coding rate for transmissions. However, some systems may have a minimum achievable coding rate value that is approximately constant across transmission time interval (TTI) lengths based on the transmission parameters for the systems.

SUMMARY

The described techniques relate to improved methods, systems, devices, and apparatuses that support transport block size (TBS) scaling factor indication for ultra-reliable low-latency communication (URLLC). Generally, the described techniques provide for wireless devices to use dynamically indicated TBS scaling factors to meet the reliability thresholds or requirements associated with certain wireless communications systems (e.g., URLLC systems). For example, a base station may select a TBS scaling factor for communication with a specific user equipment (UE). In some cases, the selected TBS scaling factor is uplink-specific, downlink-specific, or common to both link directions. The base station may indicate this selected UE-specific TBS scaling factor to a UE using an explicit TBS scaling factor indicator in a downlink transmission (e.g., radio resource control (RRC) signaling) or using an implicit relation between the TBS scaling factors and repetition modes of operation for the UE. By dynamically selecting between different supported scaling factors, the base station may implement TBS scaling factors that are non-proportional to (i.e., lower than) resource scaling factors, resulting in lower coding rates. For example, the base station may select a TBS scaling factor, $\alpha$, of $\frac{1}{12}$ for a shortened transmission time interval (sTTI) transmission, despite the sTTI spanning $\frac{1}{6}$ the resources of a standard subframe TTI. In some cases, this sTTI may be referred to as a subslot. The base station, UE, or both may utilize lower scaling factors for repetition-based transmissions than single transmissions to improve the reliability of the repetition-based transmissions without negatively affecting the processing latency.

A method for wireless communications at a UE is described. The method may include receiving, from a base station, a UE-specific TBS scaling factor indicator via a downlink transmission, identifying a TBS scaling factor based on the UE-specific TBS scaling factor indicator, determining a TBS for communication based on the identified TBS scaling factor, and communicating with the base station according to the determined TBS.

An apparatus for wireless communications at a UE is described. The apparatus may include a processor, memory coupled with the processor, and instructions stored in the memory. The instructions may be executable by the processor to cause the apparatus to receive, from a base station, a UE-specific TBS scaling factor indicator via a downlink transmission, identify a TBS scaling factor based on the UE-specific TBS scaling factor indicator, determine a TBS for communication based on the identified TBS scaling factor, and communicate with the base station according to the determined TBS.

Another apparatus for wireless communications at a UE is described. The apparatus may include means for receiving, from a base station, a UE-specific TBS scaling factor indicator via a downlink transmission, identifying a TBS scaling factor based on the UE-specific TBS scaling factor indicator, determining a TBS for communication based on the identified TBS scaling factor, and communicating with the base station according to the determined TBS.

A non-transitory computer-readable medium storing code for wireless communications at a UE is described. The code may include instructions executable by a processor to receive, from a base station, a UE-specific TBS scaling factor indicator via a downlink transmission, identify a TBS scaling factor based on the UE-specific TBS scaling factor indicator, determine a TBS for communication based on the identified TBS scaling factor, and communicate with the base station according to the determined TBS.

Some examples of the method, apparatuses, and non-transitory computer-readable medium described herein may include further operations, features, means, or instructions for receiving, from the base station, an indication of a mode of operation for the UE, where identifying the TBS scaling factor is further based on the mode of operation. In some examples of the method, apparatuses, and non-transitory computer-readable medium described herein, the mode of operation may be a repetition mode. In some examples of the method, apparatuses, and non-transitory computer-readable medium described herein, the indication of the mode of operation is received via the downlink transmission.

In some examples of the method, apparatuses, and non-transitory computer-readable medium described herein, the operations, features, means, or instructions for receiving the UE-specific TBS scaling factor indicator may include further operations, features, means, or instructions for receiving one or more bits indicating the TBS scaling factor from a set of supported TBS scaling factors.

In some examples of the method, apparatuses, and non-transitory computer-readable medium described herein, each TBS scaling factor of the set of supported TBS scaling factors may be associated with a different transmission time interval (TTI) length for communication.

In some examples of the method, apparatuses, and non-transitory computer-readable medium described herein, the operations, features, means, or instructions for receiving the UE-specific TBS scaling factor indicator via the downlink transmission may include further operations, features, means, or instructions for receiving a downlink control information (DCI) transmission, the DCI transmission including the UE-specific TBS scaling factor indicator and an indication of a number of physical downlink shared channel (PDSCH) transmission repetitions for a repetition window.

In some examples of the method, apparatuses, and non-transitory computer-readable medium described herein, the operations, features, means, or instructions for communicating with the base station according to the determined TBS may include further operations, features, means, or instructions for receiving a set of repeated PDSCH transmissions within the repetition window, where a TBS of each PDSCH transmission of the set of repeated PDSCH transmissions may be equal to the determined TBS for communication.

In some examples of the method, apparatuses, and non-transitory computer-readable medium described herein, the operations, features, means, or instructions for receiving the UE-specific TBS scaling factor indicator via the downlink transmission may include further operations, features, means, or instructions for receiving a radio resource control (RRC) configuration message including the UE-specific TBS scaling factor indicator, a repetition-based semi-persistent scheduling (SPS) configuration message including the UE-specific TBS scaling factor indicator, an activation DCI transmission including the UE-specific TBS scaling factor indicator, or a combination thereof.

In some examples of the method, apparatuses, and non-transitory computer-readable medium described herein, the operations, features, means, or instructions for communicating with the base station according to the determined TBS may include further operations, features, means, or instructions for transmitting a set of repeated physical uplink shared channel (PUSCH) transmissions according to an SPS configuration (e.g., of the SPS configuration message), where a TBS of each PUSCH transmission of the set of repeated PUSCH transmissions may be equal to the determined TBS for communication.

In some examples of the method, apparatuses, and non-transitory computer-readable medium described herein, the operations, features, means, or instructions for determining the TBS for communication may include further operations, features, means, or instructions for scaling a legacy TBS value by the TBS scaling factor and determining, from a table stored in memory, a closest valid TBS value to the scaled legacy TBS value, where the determined TBS for communication includes the determined closest valid TBS value.

In some examples of the method, apparatuses, and non-transitory computer-readable medium described herein, the UE-specific TBS scaling factor indicator is an uplink-specific TBS scaling factor indicator, a downlink-specific TBS scaling factor indicator, a shared TBS scaling factor indicator for both uplink and downlink, or a combination thereof.

In some examples of the method, apparatuses, and non-transitory computer-readable medium described herein, the TBS scaling factor may be less than a resource scaling factor for communication.

In some examples of the method, apparatuses, and non-transitory computer-readable medium described herein, the TBS scaling factor may include an additional TBS scaling factor. Some examples of the method, apparatuses, and non-transitory computer-readable medium described herein may further include operations, features, means, or instructions for multiplying the additional TBS scaling factor by a legacy TBS scaling factor, an sTTI TBS scaling factor, or both to obtain a total TBS scaling factor, where the TBS for communication may be determined based on the total TBS scaling factor.

A method for wireless communications at a base station is described. The method may include selecting a TBS scaling factor for communication and transmitting, to a UE, a UE-specific TBS scaling factor indicator via a downlink transmission, the UE-specific TBS scaling factor indicator indicating the selected TBS scaling factor. The method may further include determining a TBS for communication based on the selected TBS scaling factor and communicating with the UE according to the determined TBS.

An apparatus for wireless communications at a base station is described. The apparatus may include a processor, memory coupled with the processor, and instructions stored in the memory. The instructions may be executable by the processor to cause the apparatus to select a TBS scaling factor for communication and transmit, to a UE, a UE-specific TBS scaling factor indicator via a downlink transmission, the UE-specific TBS scaling factor indicator indicating the selected TBS scaling factor. The instructions may be further executable by the processor to cause the apparatus to determine a TBS for communication based on the selected TBS scaling factor, and communicate with the UE according to the determined TBS.

Another apparatus for wireless communications at a base station is described. The apparatus may include means for selecting a TBS scaling factor for communication and means for transmitting, to a UE, a UE-specific TBS scaling factor indicator via a downlink transmission, the UE-specific TBS scaling factor indicator indicating the selected TBS scaling factor. The apparatus may further include means for determining a TBS for communication based on the selected TBS scaling factor and means for communicating with the UE according to the determined TBS.

A non-transitory computer-readable medium storing code for wireless communications at a base station is described. The code may include instructions executable by a processor to select a TBS scaling factor for communication and transmit, to a UE, a UE-specific TBS scaling factor indicator via a downlink transmission, the UE-specific TBS scaling factor indicator indicating the selected TBS scaling factor. The code may further include instructions executable by the processor to determine a TBS for communication based on the selected TBS scaling factor and communicate with the UE according to the determined TBS.

Some examples of the method, apparatuses, and non-transitory computer-readable medium described herein may include further operations, features, means, or instructions for transmitting, to the UE, an indication of a mode of operation for the UE, where the TBS scaling factor for communication is selected based on the mode of operation and the UE-specific TBS scaling factor indicator is transmitted based on the mode of operation. In some examples of the method, apparatuses, and non-transitory computer-readable medium described herein, the mode of operation may be a repetition mode. In some examples of the method, apparatuses, and non-transitory computer-readable medium described herein, the indication of the mode of operation is transmitted via the downlink transmission.

In some examples of the method, apparatuses, and non-transitory computer-readable medium described herein, the operations, features, means, or instructions for transmitting the UE-specific TBS scaling factor indicator may include further operations, features, means, or instructions for transmitting one or more bits indicating the selected TBS scaling factor from a set of supported TBS scaling factors.

In some examples of the method, apparatuses, and non-transitory computer-readable medium described herein, each TBS scaling factor of the set of supported TBS scaling factors may be associated with a different TTI length for communication.

In some examples of the method, apparatuses, and non-transitory computer-readable medium described herein, the operations, features, means, or instructions for transmitting the UE-specific TBS scaling factor indicator via the downlink transmission may include further operations, features, means, or instructions for transmitting a DCI transmission, the DCI transmission including the UE-specific TBS scaling factor indicator and an indication of a number of PDSCH transmission repetitions for a repetition window.

In some examples of the method, apparatuses, and non-transitory computer-readable medium described herein, the operations, features, means, or instructions for communicating with the UE according to the determined TBS may include further operations, features, means, or instructions for transmitting a set of repeated PDSCH transmissions within the repetition window, where a TBS of each PDSCH transmission of the set of repeated PDSCH transmissions may be equal to the determined TBS for communication.

In some examples of the method, apparatuses, and non-transitory computer-readable medium described herein, the operations, features, means, or instructions for transmitting the UE-specific TBS scaling factor indicator via the downlink transmission may include further operations, features, means, or instructions for transmitting an RRC configuration message including the UE-specific TBS scaling factor indicator, a repetition-based SPS configuration message including the UE-specific TBS scaling factor indicator, an activation DCI transmission including the UE-specific TBS scaling factor indicator, or a combination thereof.

In some examples of the method, apparatuses, and non-transitory computer-readable medium described herein, the operations, features, means, or instructions for communicating with the UE according to the determined TBS may include further operations, features, means, or instructions for receiving a set of repeated PUSCH transmissions according to an SPS configuration (e.g., of the SPS configuration message), where a TBS of each PUSCH transmission of the set of repeated PUSCH transmissions may be equal to the determined TBS for communication.

In some examples of the method, apparatuses, and non-transitory computer-readable medium described herein, the operations, features, means, or instructions for determining the TBS for communication may include further operations, features, means, or instructions for scaling a legacy TBS value by the selected TBS scaling factor and determining, from a table stored in memory, a closest valid TBS value to the scaled legacy TBS value, where the determined TBS for communication includes the determined closest valid TBS value.

In some examples of the method, apparatuses, and non-transitory computer-readable medium described herein, the selected TBS scaling factor includes an uplink-specific TBS scaling factor, a downlink-specific TBS scaling factor, a shared TBS scaling factor for both uplink and downlink, or a combination thereof. In some examples of the method, apparatuses, and non-transitory computer-readable medium described herein, the selected TBS scaling factor may be less than a resource scaling factor for communication.

In some examples of the method, apparatuses, and non-transitory computer-readable medium described herein, the selected TBS scaling factor includes an additional TBS scaling factor. Some examples of the method, apparatuses, and non-transitory computer-readable medium described herein may further include operations, features, means, or instructions for multiplying the additional TBS scaling factor by a legacy TBS scaling factor, an sTTI TBS scaling factor, or both to obtain a total TBS scaling factor, where the TBS for communication may be determined based on the total TBS scaling factor.

In some examples of the method, apparatuses, and non-transitory computer-readable medium described herein, the operations, features, means, or instructions for selecting the TBS scaling factor may include further operations, features, means, or instructions for selecting the TBS scaling factor based on a TTI length for communication, a threshold coding rate, a threshold block error rate (BLER), a reliability threshold, or a combination thereof.

A method for wireless communications at a UE is described. The method may include receiving, from a base station, a downlink transmission indicating a mode of operation for the UE, determining a TBS scaling factor from a set of supported TBS scaling factors based on the mode, determining a TBS for communication based on the determined TBS scaling factor, and communicating with the base station according to the determined TBS.

An apparatus for wireless communications at a UE is described. The apparatus may include a processor, memory coupled with the processor, and instructions stored in the memory. The instructions may be executable by the processor to cause the apparatus to receive, from a base station, a downlink transmission indicating a mode of operation for the UE, determine a TBS scaling factor from a set of supported TBS scaling factors based on the mode, determine a TBS for communication based on the determined TBS scaling factor, and communicate with the base station according to the determined TBS.

Another apparatus for wireless communications at a UE is described. The apparatus may include means for receiving, from a base station, a downlink transmission indicating a mode of operation for the UE, determining a TBS scaling factor from a set of supported TBS scaling factors based on the mode, determining a TBS for communication based on the determined TBS scaling factor, and communicating with the base station according to the determined TBS.

A non-transitory computer-readable medium storing code for wireless communications at a UE is described. The code may include instructions executable by a processor to receive, from a base station, a downlink transmission indicating a mode of operation for the UE, determine a TBS scaling factor from a set of supported TBS scaling factors based on the mode, determine a TBS for communication based on the determined TBS scaling factor, and communicate with the base station according to the determined TBS.

In some examples of the method, apparatuses, and non-transitory computer-readable medium described herein, the mode of operation may be a repetition mode that is associated with URLLC operation and the determined TBS scaling factor may be less than a supported TBS scaling factor corresponding to enhanced mobile broadband (eMBB) operation.

Some examples of the method, apparatuses, and non-transitory computer-readable medium described herein may further include operations, features, means, or instructions for determining that the repetition mode may be associated with URLLC operation based on a DCI format, a radio network temporary identifier (RNTI) indicated in a DCI transmission, a cyclic redundancy check (CRC) masking format, or a combination thereof.

In some examples of the method, apparatuses, and non-transitory computer-readable medium described herein, the mode for the UE includes a modulation and coding scheme (MCS) table for the UE to use for communication. In some examples of the method, apparatuses, and non-transitory computer-readable medium described herein, the mode for the UE includes a BLER target for channel state information (CSI) reporting.

In some examples of the method, apparatuses, and non-transitory computer-readable medium described herein, the operations, features, means, or instructions for determining the TBS scaling factor may include further operations, features, means, or instructions for determining the TBS scaling factor based on a repetition factor for the mode.

A method for wireless communications at a base station is described. The method may include transmitting, to a UE, a downlink transmission indicating a mode of operation for the UE, determining a TBS scaling factor from a set of supported TBS scaling factors based on the mode, determining a TBS for communication based on the determined TBS scaling factor, and communicating with the UE according to the determined TBS.

An apparatus for wireless communications at a base station is described. The apparatus may include a processor, memory coupled with the processor, and instructions stored in the memory. The instructions may be executable by the processor to cause the apparatus to transmit, to a UE, a downlink transmission indicating a mode of operation for the UE, determine a TBS scaling factor from a set of supported TBS scaling factors based on the mode, determine a TBS for communication based on the determined TBS scaling factor, and communicate with the UE according to the determined TBS.

Another apparatus for wireless communications at a base station is described. The apparatus may include means for transmitting, to a UE, a downlink transmission indicating a mode of operation for the UE, determining a TBS scaling factor from a set of supported TBS scaling factors based on the mode, determining a TBS for communication based on the determined TBS scaling factor, and communicating with the UE according to the determined TBS.

A non-transitory computer-readable medium storing code for wireless communications at a base station is described. The code may include instructions executable by a processor to transmit, to a UE, a downlink transmission indicating a mode of operation for the UE, determine a TBS scaling factor from a set of supported TBS scaling factors based on the mode, determine a TBS for communication based on the determined TBS scaling factor, and communicate with the UE according to the determined TBS.

In some examples of the method, apparatuses, and non-transitory computer-readable medium described herein, the mode of operation is a repetition mode that is associated with URLLC operation and the determined TBS scaling factor may be less than a supported TBS scaling factor corresponding to eMBB operation.

Some examples of the method, apparatuses, and non-transitory computer-readable medium described herein may further include operations, features, means, or instructions for indicating that the repetition mode may be associated with URLLC operation based on a DCI format, an RNTI indicated in a DCI transmission, a CRC masking format, or a combination thereof.

In some examples of the method, apparatuses, and non-transitory computer-readable medium described herein, the mode for the UE includes an MCS table for the UE to use for communication. In some examples of the method, apparatuses, and non-transitory computer-readable medium described herein, the mode for the UE includes a BLER target for CSI reporting.

In some examples of the method, apparatuses, and non-transitory computer-readable medium described herein, the operations, features, means, or instructions for determining the TBS scaling factor may include further operations, features, means, or instructions for determining the TBS scaling factor based on a repetition factor for the mode.

DETAILED DESCRIPTION

Figure 1:
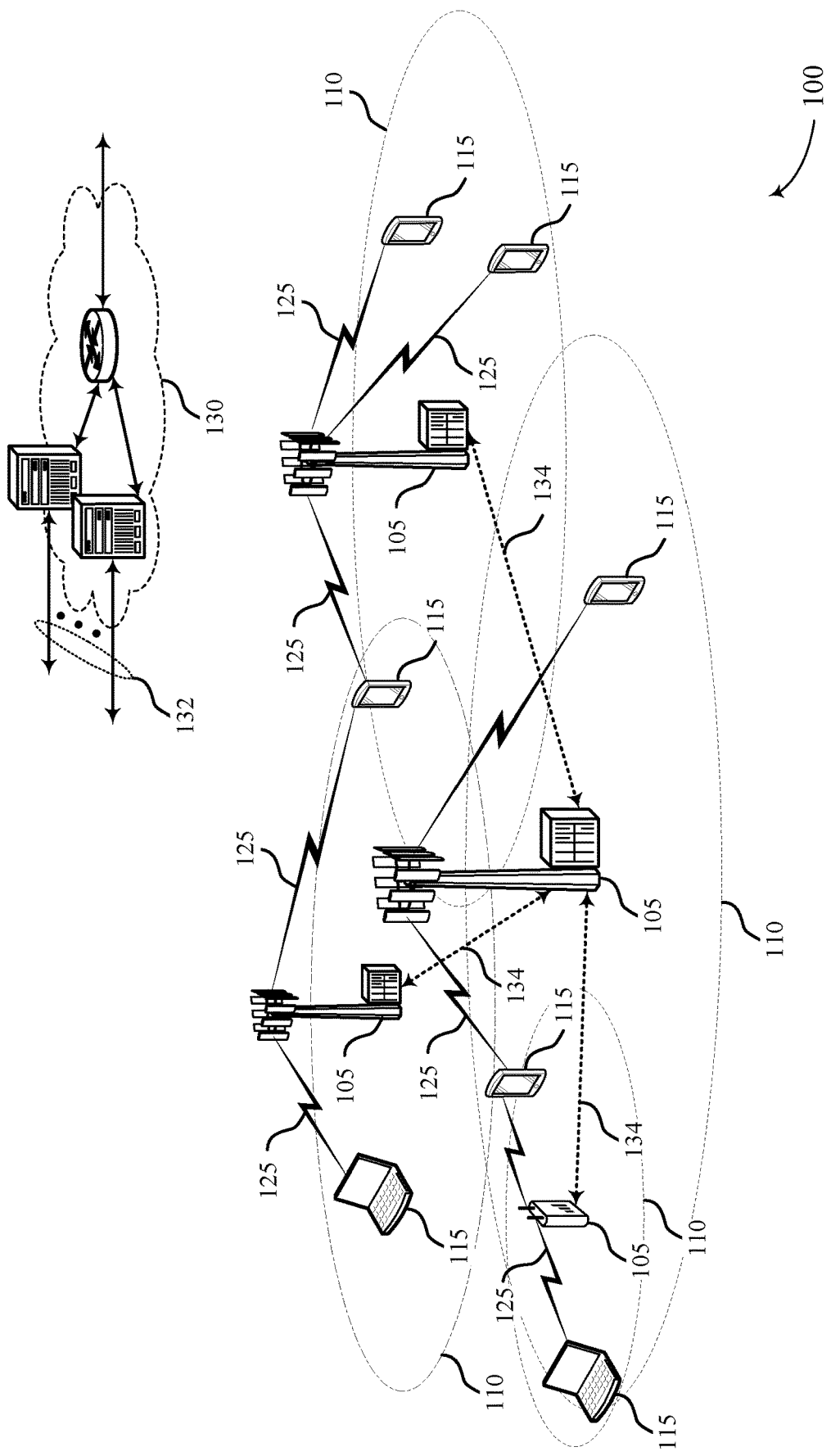
FIGS. 1 and 2 illustrate examples of wireless communications systems that support transport block size (TBS) scaling factor indication for ultra-reliable low-latency communication (URLLC) in accordance with aspects of the present disclosure.

In some wireless communications systems, base stations and user equipment (UEs) may communicate utilizing specific transmission parameters in order to meet latency thresholds, reliability thresholds, or both. In some cases, to meet a reliability threshold—or, simply to improve the reliability of transmissions—base stations, UEs, or both may perform one or more techniques to reduce the coding rate for transmissions. For example, a base station may dynamically select a transport block size (TBS) scaling factor, $\alpha$, for communications with a specific UE, where the selection may be based on a reliability threshold of the system or a target coding rate. The base station may indicate the selected TBS scaling factor to the specific UE. Based on the indication, the UE may determine the selected UE-specific TBS scaling factor, allowing the UE to correctly determine the implemented TBS scaling factor from a set of multiple supported scaling factors. For example, if the base station and the UE support multiple TBS scaling factors for a same transmission time interval (TTI) length, the dynamic indication supports both wireless devices implementing the same TBS scaling factor for communication.

In a first case, the base station may transmit an explicit UE-specific TBS scaling factor indicator to the UE. This indicator may be an example of a field within a downlink control information (DCI) transmission or a configuration message (e.g., in higher layer signaling, such as radio resource control (RRC) signaling). The UE may receive the TBS scaling factor indicator and may determine whether the scaling factor applies to downlink transmissions, uplink transmissions, or both. For example, in the downlink, the base station may transmit repetition-based physical downlink shared channel (PDSCH) transmissions to the UE within a repetition window, where the TBS scaling factor for the repetition window is indicated in a DCI bit field. In another example, in the uplink, the UE may transmit multiple physical uplink shared channel (PUSCH) transmissions according to a semi-persistent scheduling (SPS) configuration, where the multiple PUSCH transmissions use a TBS scaling factor indicated in the SPS configuration message or in an activation DCI message.

In a second case, the base station may transmit an indication of a mode of operation for the UE, where the mode is implicitly or explicitly related to a specific TBS scaling factor. In some examples, the UE may detect a repetition mode based on a number of different indications (e.g., a DCI format, a repetition factor, a cyclic redundancy check (CRC) mask, etc.) and may determine the TBS scaling factor corresponding to the detected repetition mode. In other examples, based on the repetition mode, the UE may receive and process a field indicating the TBS scaling factor corresponding to the detected repetition mode. In this way, if the UE supports multiple TBS scaling factors for a given TTI length, the UE may utilize the same TBS scaling factor as the base station based on the implemented repetition mode.

Aspects of the disclosure are initially described in the context of wireless communications systems. Additional aspects of the disclosure are described with reference to TBSs for different indicators or repetition modes and process flows describing methods for dynamically indicating the TBS scaling factors. Aspects of the disclosure are further illustrated by and described with reference to apparatus diagrams, system diagrams, and flowcharts that relate to TBS scaling factor indication (e.g., for ultra-reliable low-latency communication (URLLC)).

FIG. 1 illustrates an example of a wireless communications system 100 that supports TBS scaling factor indication for URLLC in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internetof-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation (CA) configuration in conjunction with component carriers (CCs) operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a CRC), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a TTI. In other cases, a smallest scheduling unit of the wireless communications system 100 may be shorter than a subframe or may be dynamically selected (e.g., in bursts of shortened TTIs (sTTIs) or in selected CCs using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a CA configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as CA or multi-carrier operation. A UE 115 may be configured with multiple downlink CCs and one or more uplink CCs according to a CA configuration. CA may be used with both FDD and TDD CCs.

In some cases, wireless communications system 100 may utilize enhanced CCs (eCCs). An eCC may be characterized by one or more features including wider carrier or frequency channel bandwidth, shorter symbol duration, shorter TTI duration, or modified control channel configuration. In some cases, an eCC may be associated with a CA configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some wireless communications systems 100 (e.g., NR-URLLC, LTE-URLLC systems, or other wireless systems implementing techniques for improved reliability, latency, or both), base stations 105 and UEs 115 may communicate utilizing specific transmission parameters in order to improve latency (e.g., to meet a latency threshold associated with the system), improve reliability (e.g., to meet a reliability threshold associated with the system), or both. In some cases, to meet a reliability threshold—or, simply to improve the reliability of transmissions—base stations 105 and UEs 115 may perform techniques to reduce the coding rate for transmissions. In one such technique, a base station 105 may dynamically select a TBS scaling factor for communications with a UE 115 (e.g., where the selection is based on a reliability threshold of the system or a target coding rate) and may indicate the selected TBS scaling factor to the UE 115. Based on the indication, the UE 115 may determine the selected TBS scaling factor, allowing the UE 115 to determine the implemented TBS scaling factor from a set of multiple supported scaling factors. For example, if the base station 105 and the UE 115 support multiple TBS scaling factors for a same TTI length, the dynamic indication supports both wireless devices implementing the same TBS scaling factor when transmitting and receiving the associated signal.

In a first case, the base station 105 may transmit an explicit UE-specific TBS scaling factor indicator to the UE 115. This indicator may be an example of a field within a DCI transmission or a configuration message (e.g., an RRC message). The UE 115 may receive the TBS scaling factor indicator and may determine whether the scaling factor applies to downlink transmissions, uplink transmissions, or both. For example, in the downlink, the base station 105 may transmit repetition-based PDSCH transmissions to the UE 115 within a repetition window, where the TBS scaling factor for the repetition window is indicated in a DCI bit field. In another example, in the uplink, the UE 115 may transmit multiple PUSCH transmissions according to an SPS configuration, where the multiple PUSCH transmissions use a TBS scaling factor indicated in the SPS configuration message (e.g., in an initial RRC connection configuration or an RRC reconfiguration) or in an activation DCI message.

In a second case, the base station 105 may transmit an indication of a mode of operation for the UE 115, where the mode is implicitly related to a specific TBS scaling factor. For example, the UE 115 may detect a repetition mode based on a number of different indications (e.g., a DCI format, a repetition factor, a CRC mask, RRC signaling, etc.) and may determine the TBS scaling factor corresponding to the detected repetition mode. In this way, if the UE 115 supports multiple TBS scaling factors for a given TTI length, the UE 115 may utilize the same TBS scaling factor as the base station 105 based on the implemented repetition mode.

Figure 2:
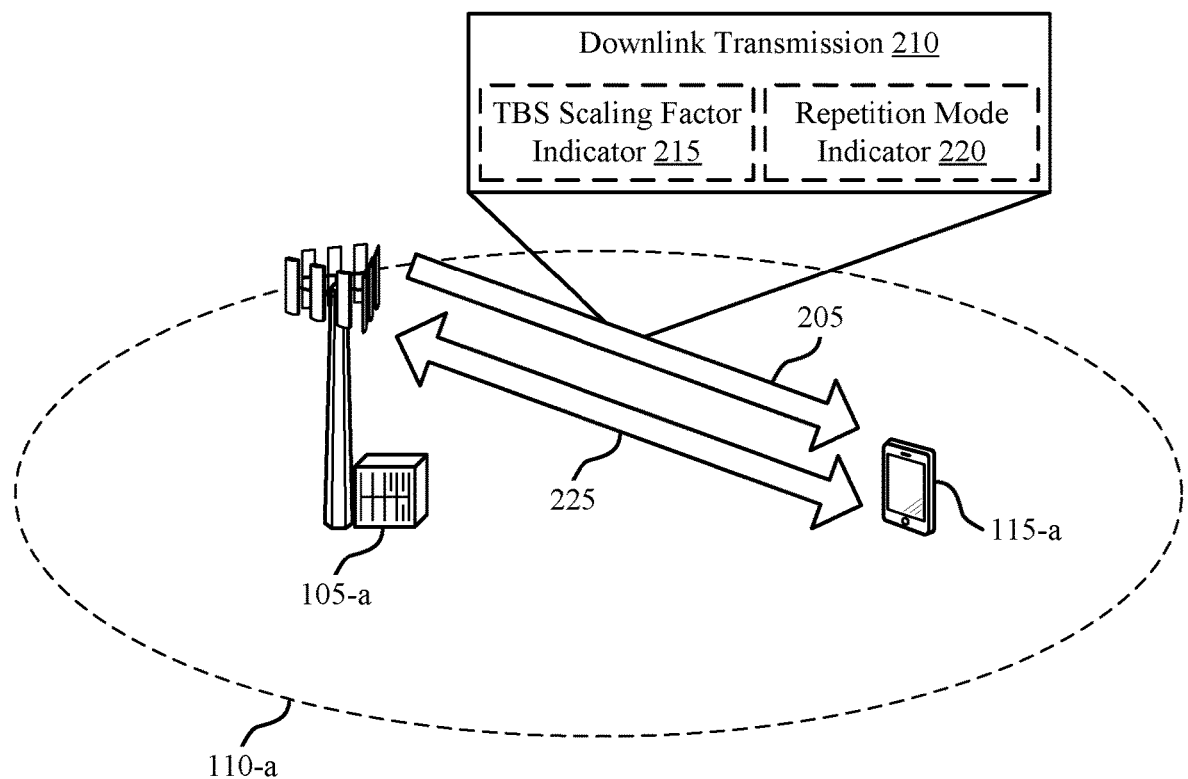

FIG. 2 illustrates an example of a wireless communications system 200 that supports TBS scaling factor indication for URLLC in accordance with aspects of the present disclosure. The wireless communications systems 200 may include base station 105-a and UE 115-a, which may be examples of the corresponding devices described with reference to FIG. 1. Base station 105-a may provide network coverage for a geographic coverage area 110-a, which may be an example of a geographic coverage area 110 described herein. In some cases, the wireless communications system 200 may implement reliability thresholds or reliability requirements for transmissions between wireless devices. For example, base station 105-a and UE 115-a may operate according to NR-URLLC modes or LTE-URLLC modes, and correspondingly may transmit using parameters that are selected to meet pre-determined latency and/or reliability requirements. In order to improve transmission reliability, base station 105-a and UE 115-a may utilize different TBS scaling factors based on different downlink indications, different modes of operation, or some combination of these. For example, a UE 115-a may receive and process a downlink indication for a TBS scaling factor, $\alpha$, based on a mode of operation (e.g., if the UE 115-a is configured with a repetition mode for uplink subslot transmissions).

The wireless communications system 200 may support URLLC services. These services may include pre-determined latency and reliability requirements for signal transmissions between devices. For example, one such set of requirements may specify that end-to-end (E2E) communications in the wireless communications system 200 have no more than a 1 millisecond (ms) delay with a reliability of at least 1 e-5. The reliability may be measured in terms of a block error rate (BLER) for a communication link. The achievable BLER for a link may decrease as the coding rate for transmission is reduced. Accordingly, lowering the coding rate may increase the transmission reliability, improving the performance of the wireless communications system 200.

Certain transmission parameters may limit the minimum achievable coding rate for wireless devices. For example, in some systems (e.g., if a device operates in a "legacy" mode), a wireless device may not reduce the coding rate below a minimum achievable coding rate of approximately 0.11. The coding rate for a transmission may be calculated according to the following formula:

$$\text{coding rate}=(TBS+CRC)/(RE \times \text{Bits per RE}), \quad (1)$$

where TBS is determined according to a scaling factor, $\alpha$, an MCS value, a number of physical resource blocks (PRBs), or some combination of these parameters. In some cases, relationships between these different parameters are defined in one or more tables stored in memory of the wireless devices. The CRC value may correspond to the number of CRC bits appended to the transport block (TB) for error detection, the resource element (RE) value may correspond to the number of REs assigned for a PDSCH or PUSCH transmission, and the bits per RE may correspond to the modulation scheme used (e.g., where the bits per RE is equal to the modulation order for the selected MCS index). Based on this equation and the supported values for these different parameters, a value of approximately 0.11 may be the lowest attainable coding rate value for a wireless device operating in certain modes (e.g., an LTE mode for a TTI spanning a subframe). For example, for an MCS index of 0 and 100 RBs, a wireless device may determine a corresponding TBS of 2792, resulting in a code rate of approximately 0.11.

For sTTIs (e.g., subslots), a wireless device may implement a TBS scaling factor to scale the legacy TBS (i.e., the TBS for a subframe-length TTI). The device may map this scaled TBS to the closest valid TBS. For example, tables in memory of the wireless device may specify the valid TBS values to select from. To determine the closest valid TBS value, the device may always round down, may always round up, or may select the closest valid value above or below the scaled value. In yet other cases, the wireless device may use the scaled TBS value as the TBS value (e.g., even if this scaled value is not defined as a "valid" value according to the tables in memory) or may round the scaled TBS value to the nearest whole number and use this rounded scaled TBS value as the TBS value for communications. In "legacy" sTTI operations, the TBS scaling factors may be tied to the length of the sTTI for transmission. For example, the TBS scaling factors may be proportional to the reduction of the TTI length from a subframe-length TTI. Accordingly, a wireless device may utilize $\alpha=\frac{1}{2}$ for slot sTTIs, $\alpha=\frac{1}{6}$ for subslot TTIs in downlink, $\alpha=\frac{1}{6}$ for subslot TTIs with two data symbols in uplink, and $\alpha=\frac{1}{12}$ for subslot TTIs with one data symbol in uplink. As the TBS value is approximately scaled proportionally to the reduction in TTI length—and, thus, the reduction in the RE value—these sTTIs may not significantly affect the coding rate. As such, the minimal achievable coding rate for legacy TTI and legacy sTTI systems may be approximately equal (e.g., around 0.11).

In order for wireless communications system 200 to further reduce the coding rate past this minimal achievable coding rate value for legacy systems, a wireless device may modify other parameters. In a first example, the wireless device may introduce new MCS indices (e.g., adding the new MCS indices to the tables stored in memory), where these new MCS indices may correspond to lower TBS values, greater modulation order values, or both. However, in some cases, these tables may be pre-defined for the devices, and may not be modified to better support high reliability operations. In a second example, the wireless device may implement repetition-based transmissions, allowing for HARQ combining at the receiving device. For example, base station 105-a may transmit a PDSCH transmission multiple times with different redundancy versions (RVs), and UE 115-a may implement HARQ combining to improve the reliability of successfully receiving and decoding the PDSCH transmission. UE 115-a may use information received from previous HARQ RVs in order to determine the information contained in a current RV. Similarly, in the uplink, UE 115-a may implement transmission repetitions (e.g., when configured with a repetition parameter). However, in some cases, implementing HARQ incremental redundancy (HARQ-IR) at low coding rates may not significantly affect the coding gain (e.g., as compared to implementing HARQ chase combining (HARQ-CC)). Accordingly, wireless devices may need additional or alternative techniques for reducing the coding rate below the above described minimal achievable coding rate.

To reduce the coding rate—and, as a result, increase reliability—within the wireless communications system 200, base station 105-a and UE 115-a may implement different TBS scaling factors for certain systems or operating modes, such as URLLC systems or modes. For example, as described above, the coding rates for TTIs and sTTIs in legacy systems may be approximately equal (assuming similar other parameters) due to the TBS and the number of resources being scaled proportional to one another. In order to further reduce the coding rate, the wireless devices may support TBS scaling factors smaller than the resource scaling factors. For example, in legacy sTTI systems, a subslot with two symbols may utilize a TBS scaling factor of $\alpha=\frac{1}{6}$. To support lower coding rates, a subslot in other systems or modes (e.g., URLLC systems) may additionally or alternatively utilize a TBS scaling factor of $\alpha=\frac{1}{12}$. That is, even though the sTTI length of the subslot is approximately $\frac{1}{6}$ of the TTI length for a subframe, the TBS may be scaled with a non-proportional value of $\frac{1}{12}$. By utilizing TBS scaling factors smaller than the TBS scaling factors in legacy systems, these high reliability systems may not negatively impact the processing timeline for the TBs, as the resulting TBs will be shorter than the TBs in legacy systems.

In one specific example, base station 105-*a* may utilize a TBS scaling factor of α=1/12, 24 CRC bits, an MCS index value of 0, and 100 RBs for transmission in a high-reliability system. Based on accessing one or more tables in memory, base station 105-*a* may determine that an MCS index value of 0 corresponds to a TBS index value of 0, and the TBS index value of 0 for 100 RBs corresponds to a legacy TBS of 2792. In some cases, base station 105-*a* may utilize equations, plots, or other mechanisms to determine the TBS, as opposed to one or more lookup tables. Base station 105-*a* may scale this legacy TBS by a (e.g., α=1/12) to obtain a scaled TBS of 233. In some cases, based on the valid TBS values stored in memory, base station 105-*a* may round this scaled TBS value to the nearest valid value (e.g., 234). Referring to the above equation, these parameters with this scaled, valid TBS value result in a coding rate of approximately 0.05, which is significantly lower than the minimum achievable coding rate of 0.11 for the legacy systems. Accordingly, utilizing non-proportional TBS scaling factors may reduce the coding rate further than proportional TBS scaling factors, supporting more reliable transmissions.

Implementing lower TBS scaling factors (e.g., for URLLC systems or modes) may allow wireless devices to support multiple TBS scaling factors for a same TTI length. For example, a wireless device may transmit or receive TBs using a TBS scaling factor of 1/6 in some systems or modes (e.g., systems or modes with more relaxed reliability standards, such as eMBB or low priority modes) while using a TBS scaling factor of 1/12 in other systems or modes (e.g., systems or modes with more strict reliability standards, such as URLLC or high priority modes). To support multiple TBS scaling factors for a given TTI length, base station 105-*a* may transmit, on the downlink 205 to UE 115-*a*, an indication of the TBS scaling factor to implement for UE 115-*a*. Base station 105-*a* may transmit this UE-specific indication in downlink transmission 210 as an explicit TBS scaling factor indicator 215, implicitly based on a repetition mode indicator 220, or based on both. In some cases, the transmitted indicator may indicate a same TBS scaling factor for both uplink and downlink communications between base station 105-*a* and UE 115-*a* (e.g., over communication link 225). In other cases, base station 105-*a* may indicate an uplink-specific TBS scaling factor, a downlink-specific TBS scaling factor, or both for a UE 115. While in some cases the repetition mode indicator 220 may indicate a repetition mode, in other cases the repetition mode indicator 220 may instead indicate other modes from which a TBS scaling factor may be implicitly derived. Therefore, while a repetition mode indicator 220 is exemplified herein, other mode of operations may also be indicated, from which a TBS scaling factor may be implied.

For downlink operations (e.g., downlink URLLC operations, downlink high priority operations, etc.), base station 105-*a* may indicate a TBS scaling factor for one or more PDSCH transmissions. For example, base station 105-*a* may support repetition-based PDSCH transmissions (e.g., where a same PDSCH message is transmitted multiple times in series without reliance on positive acknowledgment (ACK) or negative acknowledgment (NACK) messages). Alternatively, base station 105-*a* may perform one-off PDSCH transmissions. Base station 105-*a* may transmit a repetition mode indicator 220 to UE 115-*a* to indicate whether base station 105-*a* is operating using repetition-based PDSCH transmissions or single PDSCH transmissions. In some cases, based on the indicated repetition mode, UE 115-*a* may implicitly determine the TBS scaling factor from a set of supported TBS scaling factors. In other cases, base station 105-*a* may transmit an explicit UE-specific TBS scaling factor indicator 215 in a downlink transmission 210, such as a DCI transmission or RRC signaling.

The implicit indication based on the repetition mode of operation for UE 115-*a* may be determined based on a format of the downlink transmission 210. For example, if UE 115-*a* receives a DCI transmission with a specific radio network temporary identifier (RNTI) associated with a repetition mode (e.g., a URLLC mode) or a DCI format associated with a repetition mode, UE 115-*a* may determine to use a TBS scaling factor corresponding to the identified repetition mode. Additionally or alternatively, a CRC bit mask may implicitly indicate a repetition mode to UE 115-*a*, and UE 115-*a* may determine a corresponding TBS scaling factor based on the detected repetition mode. In some cases, the repetition mode indicator 220 or another signal may further indicate a repetition factor, K, corresponding to the number of repeated transmissions within a repetition window. For example, an information field in a DCI transmission may indicate a number of PDSCH transmissions for a repetition window if base station 105-*a* and UE 115-*a* are configured for repetition-based PDSCH operation. UE 115-*a* may determine a TBS scaling factor corresponding to the indicated repetition factor, K. In some examples, the repetition mode indicator 220 may further indicate an MCS table for UE 115-*a* to use for communications with base station 105-*a*. For example, base station 105-*a*, UE 115-*a*, or both may store multiple MCS tables in memory, where certain MCS tables are associated with different TBS scaling factors. For example, if base station 105-*a* indicates for UE 115-*a* to use a first MCS table (e.g., with larger coding rates as compared to a second MCS table), UE 115-*a* may select a smaller TBS scaling factor than for the second MCS table. In other examples, the repetition mode indicator 220 may indicate a BLER target for UE 115-*a* for channel state information (CSI) reporting, and UE 115-*a* may determine the TBS scaling factor based on this BLER target value. These relationships between repetition modes and TBS scaling factor values may be pre-configured for base station 105-*a* and UE 115-*a* or may be dynamically configured for different base stations 105, UEs 115, or wireless communications systems 200.

UE 115-*a* may select the implicitly indicated TBS scaling factor based on the repetition mode of operation and may use the selected scaling factor to determine the TBS for receiving PDSCH transmissions from base station 105-*a*. In some cases, UE 115-*a* may support two TBS scaling factors (e.g., two scaling factors for each TTI length), where the lower scaling factor (e.g., 1/12) corresponds to URLLC operation and the greater scaling factor (e.g., 1/6) corresponds to non-URLLC operation. In one specific example, UE 115-*a* may access a certain table in memory based on the mode of operation, where the tables correspond to or indicate the TBS scaling factor.

Additionally or alternatively, base station 105-*a* may transmit an explicit TBS scaling factor indicator 215 to UE 115-*a*. Base station 105-*a* may dynamically select a TBS scaling factor from a set of supported TBS scaling factors (e.g., based on the repetition mode of operation, a number of repetitions to perform within a repetition window, a TTI length for communication, a threshold coding rate, a threshold BLER, a reliability threshold, or some combination of these or other parameters relevant to the TBS) and may indicate to UE 115-*a* the selected UE-specific scaling factor in the TBS scaling factor indicator 215. For example, base station 105-*a* may include one or more bits in a DCI transmission to UE 115-*a* indicating the TBS scaling factor. In a first example, a 1-bit field may be implemented to indicate to UE 115-*a* which TBS scaling factor to implement if two scaling factors are supported. In a second example, a 2-bit field may be implemented to indicate the TBS scaling factor out of a set of up to four different supported TBS scaling factors. UE 115-*a* may identify the TBS scaling factor corresponding to the UE-specific TBS scaling factor indicator (e.g., in one specific scenario, a 0 bit may indicate a scaling factor of $\alpha=\frac{1}{2}$ and a 1 bit may indicate a scaling factor of $\alpha=\frac{1}{4}$) and may utilize the indicated TBS scaling factor to determine the TBS for used by base station 105-*a* for PDSCH TBs within the repetition window. In some examples, base station 105-*a* may utilize a first UE-specific TBS scaling factor with a first UE 115 and a second UE-specific TBS scaling factor with a second UE 115, where the TTIs may be the same, but the selected TBS scaling factors are different.

In some cases, base station 105-*a* may indicate to UE 115-*a* the TBS scaling factor on a repetition window-by-repetition window basis. For example, UE 115-*a* may receive the TBS scaling factor indicator 215 in a DCI transmission or RRC message configuring a repetition-based PDSCH window, and UE 115-*a* may receive and decode the PDSCH transmissions from base station 105-*a* during that repetition window using the indicated TBS scaling factor. UE 115-*a* may utilize a same or different TBS scaling factor for additional PDSCH repetition windows. In some cases, base station 105-*a* may indicate a TBS scaling factor for each repetition window. In other cases, base station 105-*a* may indicate a TBS scaling factor for a set of repetition windows, where base station 105-*a* may include an indication of the number of repetition windows in the set within a downlink transmission 210 (e.g., a DCI transmission, RRC signaling, etc.). In yet other cases, base station 105-*a* may indicate a TBS scaling factor for UE 115-*a* to use for any transmissions until UE 115-*a* receives an updated TBS scaling factor from base station 105-*a*.

Base station 105-*a* and UE 115-*a* may support different TBS scaling factors for different TTI lengths. In these cases, the TBS scaling factor indicated by a repetition mode indicator 220, a TBS scaling factor indicator 215, or both may be TTI-length specific. For example, for a TBS scaling factor indicator 215, base station 105-*a* may transmit a 1-bit field to indicate the implemented TBS scaling factor from a set of two possible TBS scaling factors. However, these two supported TBS scaling factors may be 1 and ½ for a subframe-length TTI, ½ and ¼ for a slot TTI, ⅙ and 1/12 for a subslot TTI, or any other combination of supported scaling factors. In other cases, more scaling factors may be supported for one or more of the TTI lengths. For example, a subslot TTI may support TBS scaling factors of ⅙, ⅛, 1/12, 1/24, or any combination of these or other scaling factors. Base station 105-*a* may utilize a larger bit field to indicate between larger numbers of supported TBS scaling factors. In yet other cases, some TTI lengths may support a single TBS scaling factor, in which case base station 105-*a* may not indicate the scaling factor to UE 115-*a* in either the repetition mode indicator 220 or the TBS scaling factor indicator 215, and UE 115-*a* may determine the scaling factor based on the TTI length for transmission. For example, subframe-length TTIs may only support a scaling factor of 1, while slot-length sTTIs, subslot-length sTTIs, or both may support multiple TBS scaling factors as described herein. Additionally or alternatively, the supported TBS scaling factors may be specific to the transmission direction of messages (e.g., uplink or downlink).

For uplink operations (e.g., uplink URLLC operations, uplink high priority operations, etc.), base station 105-*a* may indicate a TBS scaling factor for one or more PUSCH transmissions. For example, base station 105-*a* and UE 115-*a* may support repetition-based SPS. Base station 105-*a* may transmit an SPS configuration message to UE 115-*a* on the downlink 205 (e.g., via RRC messaging). The SPS configuration may specify resources for UE 115-*a* to use in the uplink, a periodicity for PUSCH transmissions in the uplink, or other parameters for repetition-based PUSCH transmissions. For example, the downlink transmission 210 (e.g., an RRC signal) may include a higher layer parameter "totalNumberPUSCH-SPS-STTI-UL-Repetitions" (e.g., a repetition mode indicator 220) indicating that the UE 115-*a* is configured with a repetition mode (e.g., for uplink transmissions). In some cases, base station 105-*a* may additionally transmit an activation DCI message to UE 115-*a*, indicating for UE 115-*a* to begin transmitting PUSCH messages according to the SPS configuration. In some cases, base station 105-*a* may transmit a deactivation DCI message to signal for UE 115-*a* to stop transmitting according to the SPS configuration.

Base station 105-*a* may indicate a TBS scaling factor to UE 115-*a* for the PUSCH transmissions. Similar to the downlink case, base station 105-*a* may dynamically select the TBS scaling factor from a supported set of scaling factors and may indicate the scaling factor for PUSCH transmissions implicitly with a repetition mode indicator 220, explicitly with a TBS scaling factor indicator 215, or using a combination of both. Base station 105-*a* may configure the TBS scaling factor indicator 215 for UE 115-*a* in the SPS configuration procedure (e.g., in RRC signaling) or may include the TBS scaling factor indicator 215 as a bit field in the activation DCI. For example, the downlink transmission 210 (e.g., an RRC signal) may include a higher layer parameter "tbs-scalingFactorSubslotSPS-UL-Repetitions" (e.g., a TBS scaling factor indicator 215) indicating the TBS scaling factor, $\alpha$, to UE 115-*a*. In some cases, UE 115-*a* may receive the repetition mode indicator 220 and the TBS scaling factor indicator 215 in the same downlink transmission 210 (e.g., RRC message). In other cases, UE 115-*a* may receive the indicators in different messages (e.g., the repetition mode indicator 220 in a first RRC signal and the TBS scaling factor indicator 215 in a second RRC signal). In some examples, a TBS scaling factor may be specific to a certain SPS configuration, a certain TTI length (e.g., a subslot-length TTI), to a certain activation period, or to both. For example, if base station 105-*a* includes the TBS scaling factor indicator 215 in the activation DCI, UE 115-*a* may transmit PUSCH messages using the indicated TBS according to the SPS configuration. If UE 115-*a* receives a reactivation DCI message from base station 105-*a* (e.g., following a deactivation DCI message or while still in an activated mode), UE 115-*a* may switch to a different TBS scaling factor if a different scaling factor is indicated by the TBS scaling factor indicator 215 for the reactivation DCI message.

In some cases, base station 105-*a* may indicate the TBS scaling factor for UE 115-*a* to use. For example, base station 105-*a* may implicitly indicate a TBS scaling factor for converting a legacy TBS to a scaled TBS for transmission using a repetition mode indicator 220, or may explicitly indicate the TBS scaling factor using a bit field (e.g., a TBS scaling factor indicator 215) to indicate one scaling factor out of a set of supported scaling factors (e.g., for the specific TTI-length). In other cases, base station 105-a may implicitly or explicitly indicate an additional TBS scaling factor to be used in conjunction with a legacy TBS scaling factor (e.g., a legacy TTI or sTTI scaling factor). For example, this additional TBS scaling factor may be 1 if UE 115-a is to reuse the legacy scaling factor, or may be less than 1 (e.g., 1/2, 1/4 etc.) if UE 115-a is to use a non-proportional TBS scaling factor for improved reliability. Base station 105-a and UE 115-a may multiply this additional scaling factor by the legacy scaling factor to determine a total scaling factor for communication. For example, for a subslot spanning 1 data symbol, the legacy TBS scaling factor may be 1/12, and the additional scaling factor may be 1/2, resulting in a total scaling factor of 1/24. UE 115-a may use this total scaling factor when determining a TBS for communication with base station 105-a (e.g., in PUSCH transmission or PDSCH reception).

It is to be understood that any of the functions, parameters, or techniques described above with respect to downlink operation may be implemented for uplink operation, and vice versa. Additionally, while the above description focuses on repetition-based URLLC, the described TBS scaling factor indication techniques may be implemented in any type of communication system or mode to increase the transmission reliability between devices.

Figure 3:
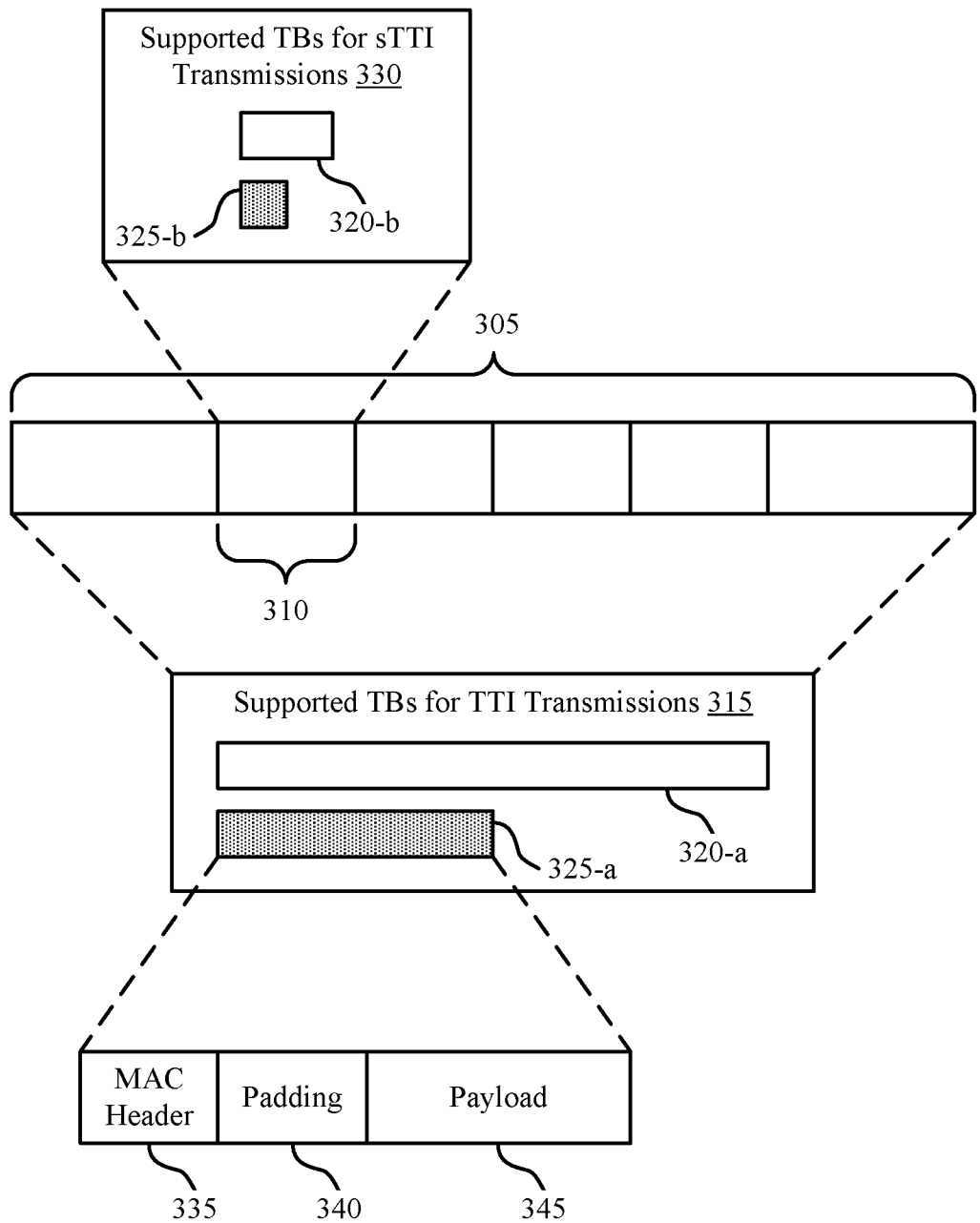
FIG. 3 illustrates exemplary TBSs for different indications, modes, or both that support TBS scaling factor indication for URLLC in accordance with aspects of the present disclosure.

FIG. 3 illustrates exemplary TBSs 300 for different indications, modes, or both that support TBS scaling factor indication for URLLC in accordance with aspects of the present disclosure. The TBSs 300 for different indications and/or modes may be implemented by UEs 115, base stations 105, or both, as described with reference to FIGS. 1 and 2. For example, UEs 115 and base stations 105 may determine the TBSs based on explicit or implicit indications of TBS scaling factors and may use the determined TBSs for communications (e.g., single or repetition-based PUSCH transmissions in the uplink, single or repetition-based PDSCH transmissions in the downlink, or a combination of the two). The TBS scaling factors may further be based on TTI lengths for transmission. For example, the supported TBS scaling factors may differ between TTIs spanning a subframe 305 and sTTIs spanning a slot or subslot 310.

As illustrated, UEs 115 and base stations 105 may support multiple TBs for TTI transmissions 315. For example, the wireless devices may support a TB 320-a with a first TBS calculated using a legacy or low priority TTI TBS scaling factor (e.g., $\alpha=1$) and a TB 325-a with a second TBS calculated using a high-reliability or high priority TTI TBS scaling factor (e.g., $\alpha=1/2$). If a wireless device is configured for subframe 305 length transmissions, the wireless device may identify whether the higher or lower TBS scaling factor is indicated. For example, if a UE 115 receives an indication to operate in a repetition mode associated with URLLC operation, receives an explicit indication to use the lower scaling factor in a bit field of a configuration message or a DCI message, or both, the UE 115 may determine to use $\alpha=1/2$ and may implement TB 325-a for increased reliability. While two TBS scaling factors are illustrated for subframe 305 length TTIs, wireless devices may support more or fewer TBS scaling factors for this TTI-length.

Similarly, UEs 115 and base stations 105 may support multiple TBs for sTTI transmissions 330. For example, the wireless devices may support a TB 320-b with a first TBS calculated using a legacy or low priority sTTI TBS scaling factor (e.g., $\alpha=1/6$) and a TB 325-b with a second TBS calculated using a high-reliability or high priority sTTI TBS scaling factor (e.g., $\alpha=1/12$). If a base station 105 selects to use the lower TBS scaling factor or if a UE 115 receives a downlink transmission from the base station 105 indicating the lower TBS scaling factor (e.g., based on the mode of operation, a TBS indicator field, or both), the base station 105 and UE 115 may utilize TB 325-b for communications. These communications may be associated with a higher-reliability metric than communications utilizing TB 320-b and the corresponding higher TBS scaling factor.

Each TB 320 or 325 may include a set of information bits for transmission on the uplink or downlink. This information may include a medium access control (MAC) header 335, padding bits 340, payload bits 345, or some combination of these or other types of information for transmission. The information may be generated or identified throughout a multi-layer procedure. In one specific example, a packet data compression protocol (PDCP) layer may retrieve payload data and compress the payload data into payload bits 345. This payload information may be passed to a radio link control (RLC) layer, which may concatenate or separate the payload information into a specified block size. The RLC layer may send the correctly sized information to a MAC layer, which may select an MCS and configure the information into the determined TBS. The MAC layer may additionally add a MAC header 335, padding bits 340, or both to the specifically sized payload bits 345 received from the RLC layer. The resulting TB 320 or 325 may be transmitted within a TTI or sTTI of a specified length.

Figure 4:
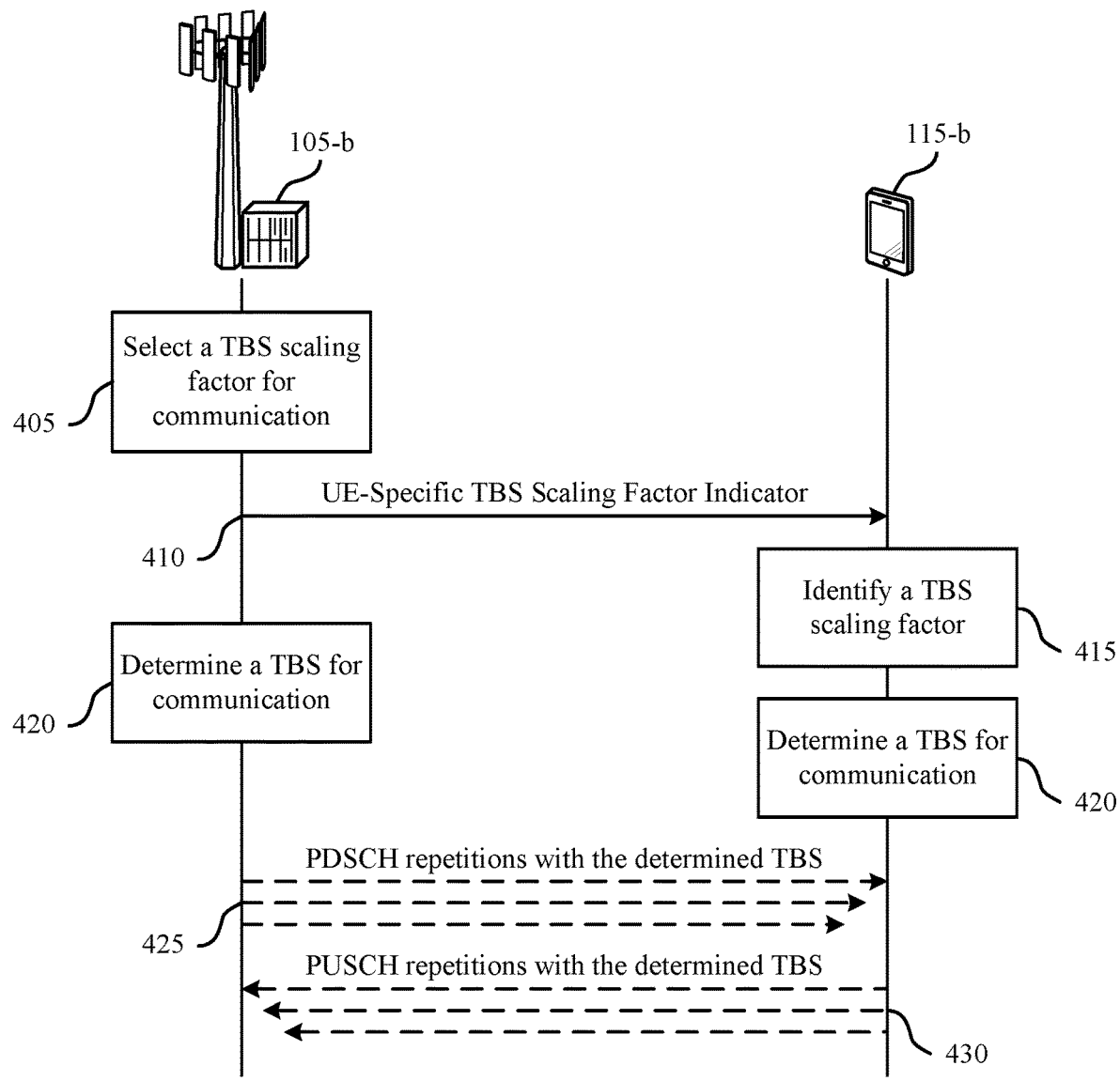
FIGS. 4 and 5 illustrate examples of process flows that support TBS scaling factor indication for URLLC in accordance with aspects of the present disclosure.

FIG. 4 illustrates an example of a process flow 400 that supports TBS scaling factor indication for URLLC in accordance with aspects of the present disclosure. The process flow 400 may include base station 105-b and UE 115-b, which may be examples of the base stations 105 and UEs 115 described with reference to FIGS. 1 through 3. In some wireless communications systems (e.g., systems with high reliability requirements, such as URLLC systems), base station 105-b may dynamically indicate a TBS scaling factor to UE 115-a to use for communications. The TBS scaling factor may result in a smaller TBS and, correspondingly, a higher reliability. Alternative examples of the following may be implemented, where some steps are performed in a different order than described or not performed at all. In some cases, steps may include additional features not mentioned below, or further steps may be added (e.g., steps described with reference to FIG. 5).

At 405, base station 105-b may dynamically select a TBS scaling factor for communication with UE 115-b. The selected TBS scaling factor may be an example of an uplink-specific TBS scaling factor, a downlink-specific TBS scaling factor, a shared TBS scaling factor for both uplink and downlink, or some combination thereof. This selected TBS scaling factor may be less than a resource scaling factor for communication. For example, if an sTTI for communication is approximately 1/6 the length of a subframe TTI, the selected TBS scaling factor may be 1/12, which is not proportional to the resource scaling factor of 1/6. In some cases, base station 105-b may select the TBS scaling factor based on a mode of operation for UE 115-b (e.g., a URLLC or high priority mode), a repetition factor for UE 115-b (e.g., a repetition mode configuration for UE 115-b), a TTI length for communication (e.g., a subslot-length TTI), a threshold coding rate, a threshold BLER, a reliability threshold, or some combination of these parameters.

At 410, base station 105-b may transmit, to UE 115-b, a UE-specific TBS scaling factor indicator via a downlink transmission (e.g., RRC signaling, a DCI transmission, a configuration message, etc.), where the UE-specific TBS scaling factor indicator indicates the selected TBS scaling factor. For example, base station 105-*b* may transmit the UE-specific TBS scaling factor indicator as one or more bits indicating the selected TBS scaling factor out of a set of supported TBS scaling factors (e.g., where the set of TBS scaling factors is TTI length-specific, link direction-specific, or both). In some cases, the transmission may be an RRC message or a DCI transmission including the UE-specific TBS scaling factor indicator and an additional indication of a number of PDSCH or PUSCH transmission repetitions for a repetition window. In some examples, UE 115-*b* may identify the UE-specific TBS scaling factor indicator based on the indicated PDSCH or PUSCH transmission repetitions. In some cases, the transmission may be a repetition-based SPS configuration message (e.g., an RRC message) or an activation DCI transmission containing the UE-specific TBS scaling factor indicator. UE 115-*b* may receive the downlink transmission and identify the UE-specific TBS scaling factor indicator (e.g., based on the indicated repetition mode).

At 415, UE 115-*b* may identify a TBS scaling factor based on the UE-specific TBS scaling factor indicator. For example, when successfully receiving the downlink transmission, this identified TBS scaling factor is the same as the scaling factor selected by base station 105-*b*.

At 420, base station 105-*b* and UE 115-*b* may determine a TBS for communication based on the TBS scaling factor (e.g., the scaling factor selected by base station 105-*b* and identified by UE 115-*b*). This determination process may involve scaling a legacy TBS value by the TBS scaling factor and determining, from a table in memory, a closest valid TBS value to the scaled legacy TBS value. This closest valid TBS value may be used for communications. In some cases, the TBS scaling factor is an additional TBS scaling factor, and base station 105-*b* and UE 115-*b* may calculate a total TBS scaling factor by multiplying the additional TBS scaling factor with a legacy scaling factor (e.g., a legacy TTI scaling factor, an sTTI scaling factor, etc.).

Base station 105-*b* and UE 115-*b* may then communicate using the determined TBS. In some cases (e.g., if the TBS applies to downlink transmissions), at 425, base station 105-*b* may transmit a set of repeated PDSCH transmissions within a repetition window to UE 115-*b*, where a TBS for each of the repetitions is equal to the determined TBS for communication. In other cases (e.g., if the TBS applies to uplink transmissions), at 430, UE 115-*b* may transmit a set of repeated PUSCH transmissions according to an SPS configuration (e.g., indicated in a received SPS configuration message), where a TBS of each PUSCH transmission is equal to the determined TBS for communication. In either case, utilizing the dynamically selected TBS scaling factor may result in a shorter TBS and a more reliable transmission than if a legacy TBS scaling factor was utilized.

Figure 5:
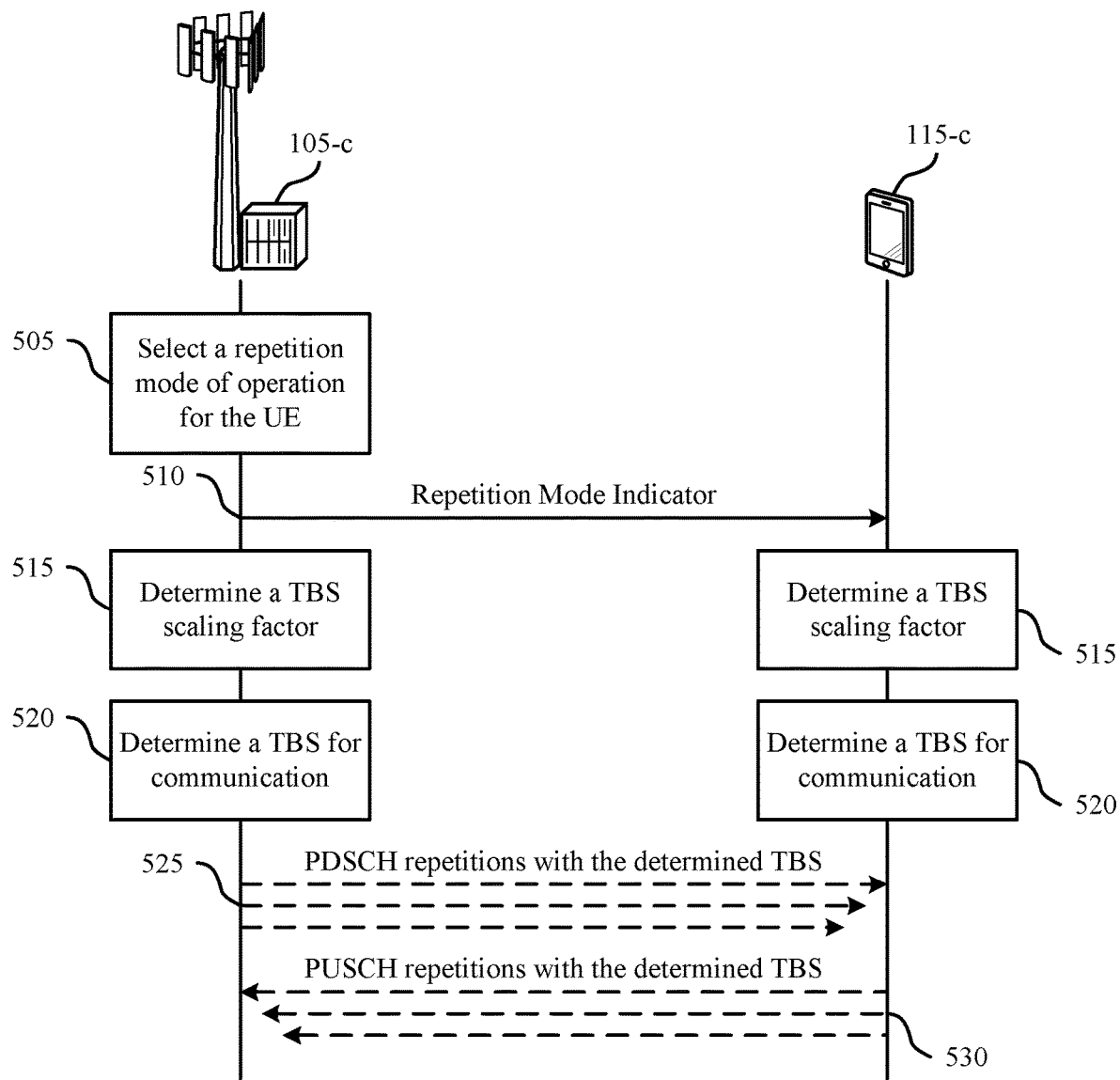

FIG. 5 illustrates an example of a process flow 500 that supports TBS scaling factor indication for URLLC in accordance with aspects of the present disclosure. The process flow 500 may include base station 105-*c* and UE 115-*c*, which may be examples of the base stations 105 and UEs 115 described with reference to FIGS. 1 through 4. In some wireless communications systems (e.g., systems with high reliability requirements, such as URLLC systems), base station 105-*c* may implicitly indicate a TBS scaling factor to UE 115-*c* according to a repetition mode for operation. The TBS scaling factor may result in a smaller TBS and, correspondingly, a higher reliability. Alternative examples of the following may be implemented, where some steps are performed in a different order than described or not performed at all. In some cases, steps may include additional features not mentioned below, or further steps may be added (e.g., steps described with reference to FIG. 4).

At 505, base station 105-*c* may select a repetition mode of operation for UE 115-*c*. This selection may be based on characteristics of UE 115-*c* or base station 105-*c*, capabilities of UE 115-*c* or base station 105-*c*, reliability thresholds or requirements for the system, or some combination of these.

At 510, base station 105-*c* may transmit, to UE 115-*c*, a downlink transmission indicating the repetition mode of operation for UE 115-*c*. In some cases, the repetition mode is associated with URLLC or high priority operation. This URLLC or high priority association may be indicated based on a DCI format of the downlink transmission, an RNTI indicated in the DCI, a CRC masking format, an RRC indicator, or some combination of these. In other cases, the repetition mode may refer to an MCS table for UE 115-*c* to use for communication, a BLER for CSI reporting for UE 115-*c* to use for communication, a repetition factor, K, for the repetition mode, or any combination of these or similar parameters.

At 515, base station 105-*c* and UE 115-*c* may determine a TBS scaling factor from a set of supported TBS scaling factors based on the repetition mode. For URLLC operations, this determined TBS scaling factor may be less than an eMBB or low priority TBS scaling factor.

At 520, base station 105-*c* and UE 115-*c* may determine a TBS for communication based on the determined TBS scaling factor. At 525 and/or 530, base station 105-*c* and UE 115-*c* may communicate according to the determined TBS. For example, at 525 base station 105-*c* may transmit and UE 115-*c* may receive multiple PDSCH transmission repetitions using the determined TBS. In another example, at 530, UE 115-*c* may transmit and base station 105-*c* may receive PUSCH transmission repetitions using the determined TBS.

As described herein, some steps of the process flows 400 and 500 may include additional features not mentioned, or further steps may be added. For example, base stations 105, UEs 115, or both may perform functionality described with reference to both FIG. 4 and FIG. 5. As described herein, the wireless devices may indicate the TBS scaling factor, α, using a combination of the repetition mode indicator and the UE-specific TBS scaling factor indicator. For example, UE 115-*c* may receive the repetition mode indicator. If UE 115-*c* determines that it is in a repetition mode (e.g., based on the repetition mode indicator), UE 115-*c* may determine if it additionally received the UE-specific TBS scaling factor indicator and may operate according to the indicated scaling factor. If UE 115-*c* does not receive the repetition mode indicator (or receives an indication that UE 115-*c* is not configured for the repetition mode), UE 115-*c* may refrain from determining if it received the UE-specific TBS scaling factor indicator. For example, base station 105-*c* may not include the TBS scaling factor indicator in signaling (e.g., RRC signaling) for UEs 115 configured for single transmissions.

Figure 6:
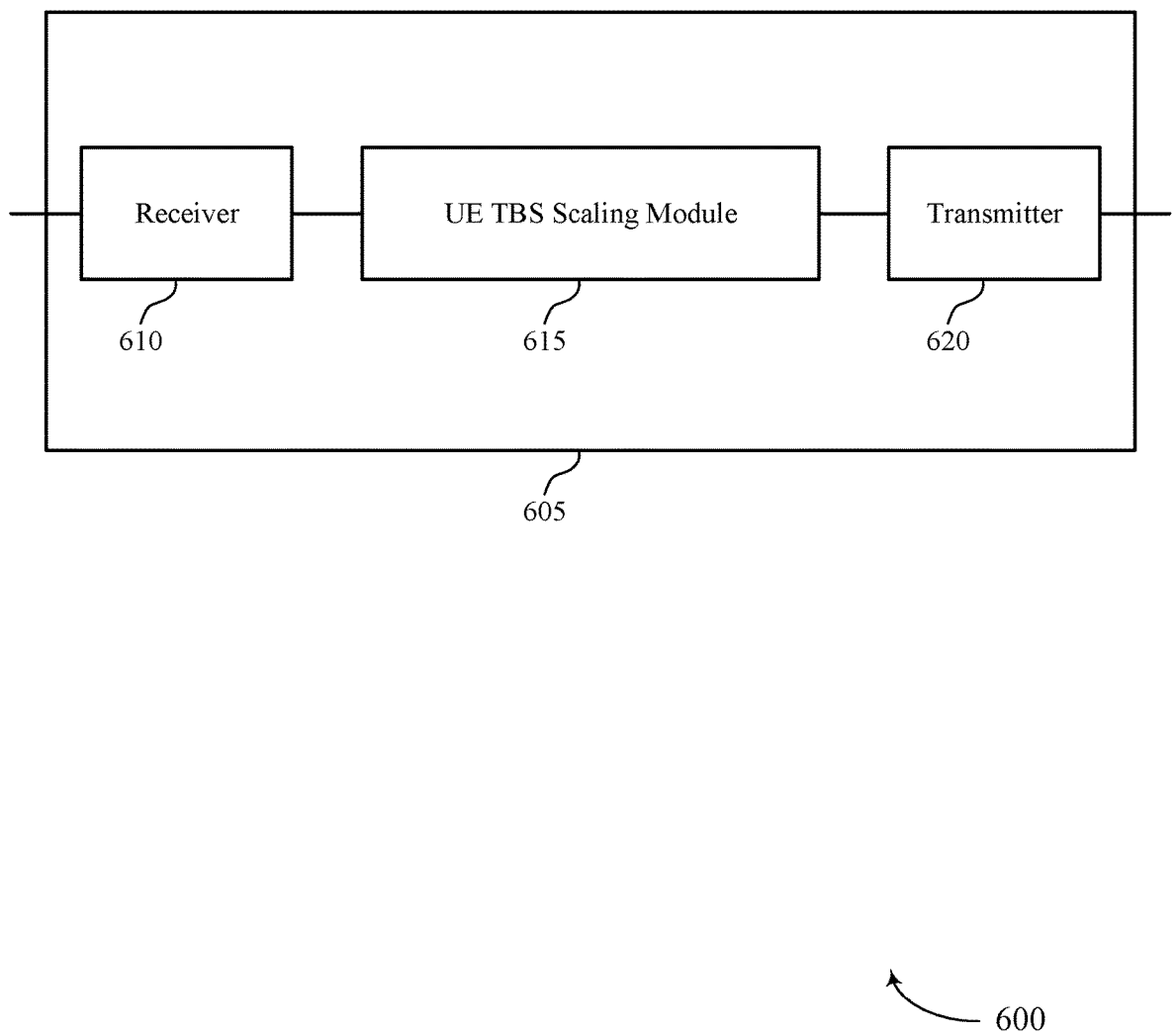
FIGS. 6 and 7 show block diagrams of devices that support TBS scaling factor indication for URLLC in accordance with aspects of the present disclosure.

FIG. 6 shows a block diagram 600 of a device 605 that supports TBS scaling factor indication for URLLC in accordance with aspects of the present disclosure. The device 605 may be an example of aspects of a UE 115 as described herein. The device 605 may include a receiver 610, a TBS scaling module 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to TBS scaling factor indication, etc.). Information may be passed on to other components of the device 605. The receiver 610 may be an example of aspects of the transceiver 920 described with reference to FIG. 9. The receiver 610 may utilize a single antenna or a set of antennas.

In a first example, the TBS scaling module 615 may receive, from a base station, a UE-specific TBS scaling factor indicator via a downlink transmission, identify a TBS scaling factor based on the UE-specific TBS scaling factor indicator, determine a TBS for communication based on the identified TBS scaling factor, and communicate with the base station according to the determined TBS.

In a second example, the TBS scaling module 615 may receive, from a base station, a downlink transmission indicating a repetition mode of operation for the UE, determine a TBS scaling factor from a set of supported TBS scaling factors based on the repetition mode, determine a TBS for communication based on the determined TBS scaling factor, and communicate with the base station according to the determined TBS. The TBS scaling module 615 may be an example of aspects of the TBS scaling module 910 described herein.

The TBS scaling module 615, or its sub-components, may be implemented in hardware, code (e.g., software or firmware) executed by a processor, or any combination thereof. If implemented in code executed by a processor, the functions of the TBS scaling module 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The TBS scaling module 615, or its sub-components, may be physically located at various positions, including being distributed such that portions of functions are implemented at different physical locations by one or more physical components. In some examples, the TBS scaling module 615, or its sub-components, may be a separate and distinct component in accordance with various aspects of the present disclosure. In some examples, the TBS scaling module 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
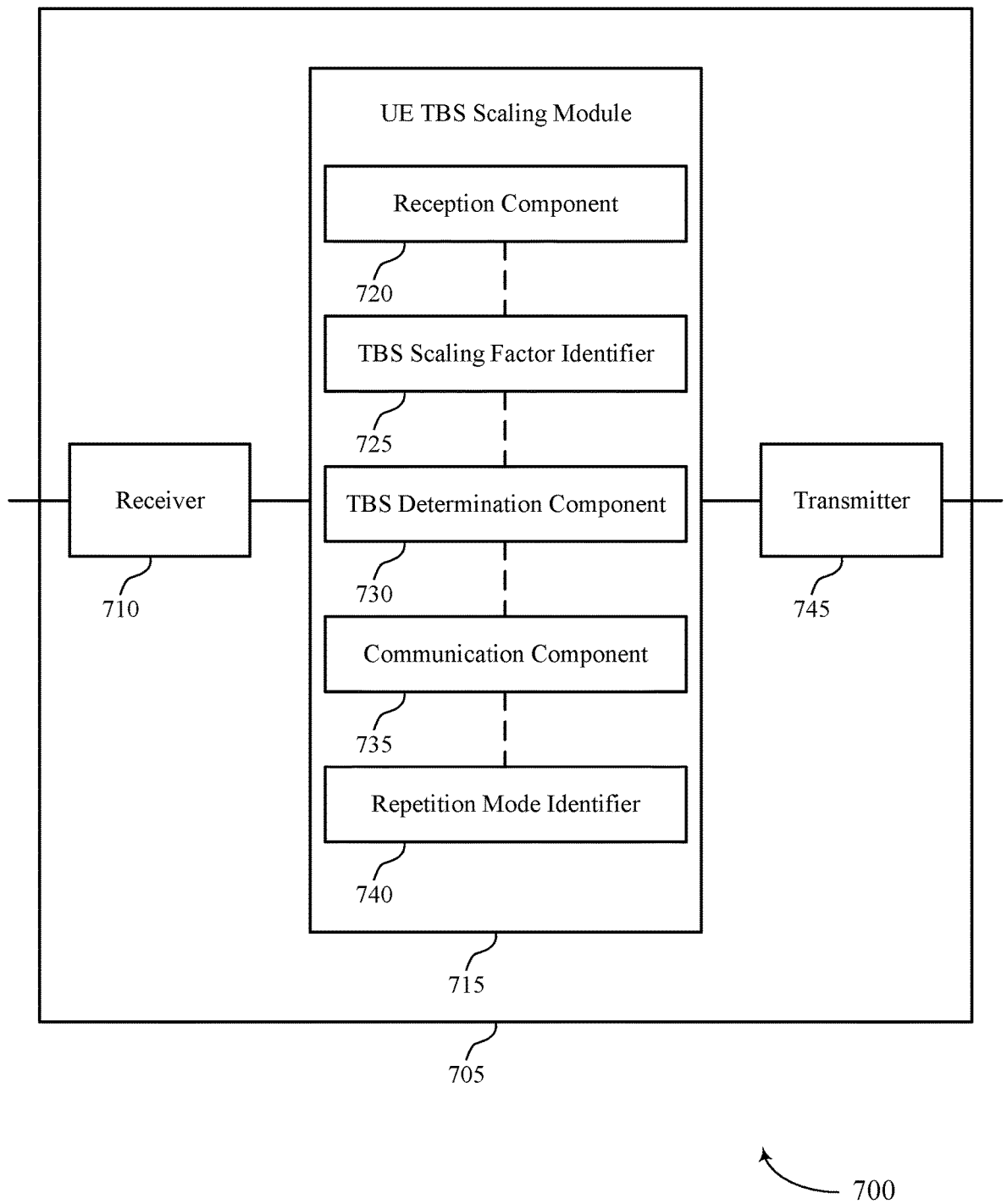

FIG. 7 shows a block diagram 700 of a device 705 that supports TBS scaling factor indication for URLLC in accordance with aspects of the present disclosure. The device 705 may be an example of aspects of a device 605 or a UE 115 as described herein. The device 705 may include a receiver 710, a TBS scaling module 715, and a transmitter 745. The device 705 may also include a processor. Each of these components may be in communication with one another (e.g., via one or more buses).

The receiver 710 may receive information such as packets, user data, or control information associated with various information channels (e.g., control channels, data channels, and information related to TBS scaling factor indication, etc.). Information may be passed on to other components of the device 705. The receiver 710 may be an example of aspects of the transceiver 920 described with reference to FIG. 9. The receiver 710 may utilize a single antenna or a set of antennas.

The TBS scaling module 715 may be an example of aspects of the TBS scaling module 615 as described herein. The TBS scaling module 715 may include a reception component 720, a TBS scaling factor identifier 725, a TBS determination component 730, a communication component 735, and a repetition mode identifier 740. The TBS scaling module 715 may be an example of aspects of the TBS scaling module 910 described herein.

In some cases, the reception component 720 may receive, from a base station, a UE-specific TBS scaling factor indicator via a downlink transmission. The TBS scaling factor identifier 725 may identify a TBS scaling factor based on the UE-specific TBS scaling factor indicator. The TBS determination component 730 may determine a TBS for communication based on the identified TBS scaling factor. The communication component 735 may communicate with the base station according to the determined TBS.

Additionally or alternatively, the repetition mode identifier 740 may receive, from a base station, a downlink transmission indicating a repetition mode of operation for the UE. The TBS scaling factor identifier 725 may determine a TBS scaling factor from a set of supported TBS scaling factors based on the repetition mode. The TBS determination component 730 may determine a TBS for communication based on the determined TBS scaling factor. The communication component 735 may communicate with the base station according to the determined TBS.

The transmitter 745 may transmit signals generated by other components of the device 705. In some examples, the transmitter 745 may be collocated with a receiver 710 in a transceiver module. For example, the transmitter 745 may be an example of aspects of the transceiver 920 described with reference to FIG. 9. The transmitter 745 may utilize a single antenna or a set of antennas.

Figure 8:
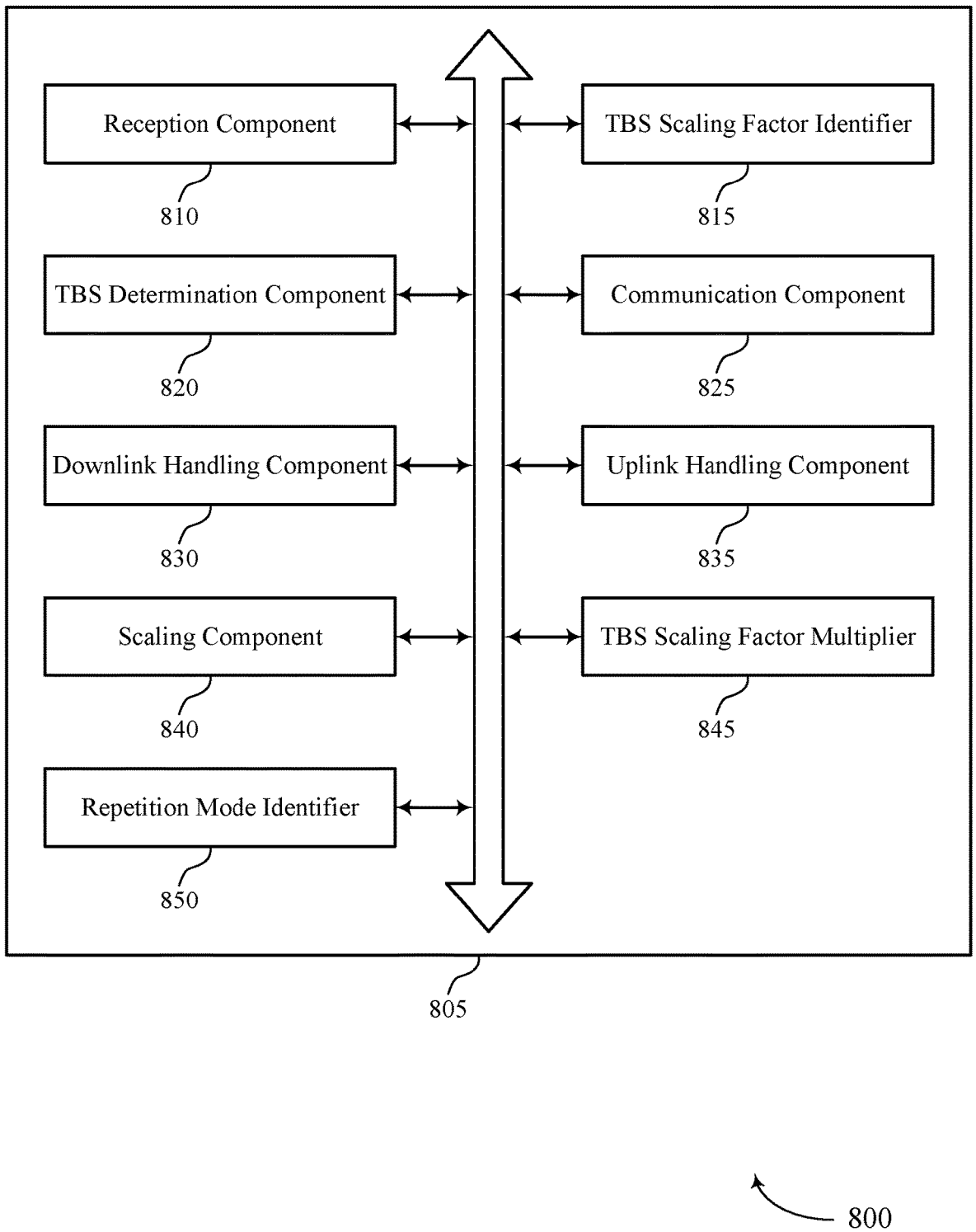
FIG. 8 shows a block diagram of a TBS scaling module that supports TBS scaling factor indication for URLLC in accordance with aspects of the present disclosure.

FIG. 8 shows a block diagram 800 of a TBS scaling module 805 that supports TBS scaling factor indication for URLLC in accordance with aspects of the present disclosure. The TBS scaling module 805 may be an example of aspects of a TBS scaling module 615, a TBS scaling module 715, or a TBS scaling module 910 described herein. The TBS scaling module 805 may include a reception component 810, a TBS scaling factor identifier 815, a TBS determination component 820, a communication component 825, a downlink handling component 830, an uplink handling component 835, a scaling component 840, a TBS scaling factor multiplier 845, and a repetition mode identifier 850. Each of these modules may communicate, directly or indirectly, with one another (e.g., via one or more buses).

In a first example, the reception component 810 may receive, from a base station, a UE-specific TBS scaling factor indicator via a downlink transmission. In some examples, the reception component 810 may receive one or more bits indicating the TBS scaling factor from a set of supported TBS scaling factors. In some cases, each of the set of supported TBS scaling factors is associated with a different TTI length for communication.

In some cases, the UE-specific TBS scaling factor indicator includes an uplink-specific TBS scaling factor indicator, a downlink-specific TBS scaling factor indicator, a shared TBS scaling factor indicator for both uplink and downlink, or a combination thereof. In some cases, the TBS scaling factor is less than a resource scaling factor for communication.

In a second example, the repetition mode identifier 850 may receive, from a base station, a downlink transmission indicating a repetition mode of operation for the UE. In some cases, the repetition mode is associated with URLLC operation or high priority operation. In some examples, the repetition mode identifier 850 may determine that the repetition mode is associated with URLLC operation based on a DCI format, an RNTI indicated in a DCI transmission, a CRC masking format, or a combination thereof.

In some cases, the repetition mode for the UE includes an MCS table for the UE to use for communication. In some cases, the repetition mode for the UE includes a BLER target for CSI reporting.

The TBS scaling factor identifier 815 may identify a TBS scaling factor based on the UE-specific TBS scaling factor indicator, may determine the TBS scaling factor from a set of supported TBS scaling factors based on the repetition mode, or may determine the TBS scaling factor based on a combination of this information.

In some examples, the TBS scaling factor identifier 815 may determine the TBS scaling factor based on a repetition factor for the repetition mode. In some cases, the determined TBS scaling factor is less than a supported TBS scaling factor corresponding to eMBB or low priority operation.

The TBS determination component 820 may determine a TBS for communication based on the identified or determined TBS scaling factor. The communication component 825 may communicate with the base station according to the determined TBS.

The downlink handling component 830 may receive a DCI transmission, the DCI transmission including the UE-specific TBS scaling factor indicator and an indication of a number of PDSCH transmission repetitions for a repetition window. In some examples, the downlink handling component 830 may receive a set of repeated PDSCH transmissions within the repetition window, where a TBS of each PDSCH transmission of the set of repeated PDSCH transmissions is equal to the determined TBS for communication.

The uplink handling component 835 may receive a repetition-based SPS configuration message (e.g., in RRC signaling) including the UE-specific TBS scaling factor indicator, an activation DCI transmission including the UE-specific TBS scaling factor indicator, or a combination thereof. In some examples, the uplink handling component 835 may transmit a set of repeated PUSCH transmissions according to an SPS configuration of the SPS configuration message, where a TBS of each PUSCH transmission of the set of repeated PUSCH transmissions is equal to the determined TBS for communication.

The scaling component 840 may scale a legacy TBS value by the TBS scaling factor and may determine, from a table stored in memory, a closest valid TBS value to the scaled legacy TBS value, where the determined TBS for communication includes the determined closest valid TBS value.

In some cases, the TBS scaling factor may be an additional TBS scaling factor. The TBS scaling factor multiplier 845 may multiply the additional TBS scaling factor by a legacy TBS scaling factor, an sTTI TBS scaling factor, or both to obtain a total TBS scaling factor, where the TBS for communication is determined based on the total TBS scaling factor.

Figure 9:
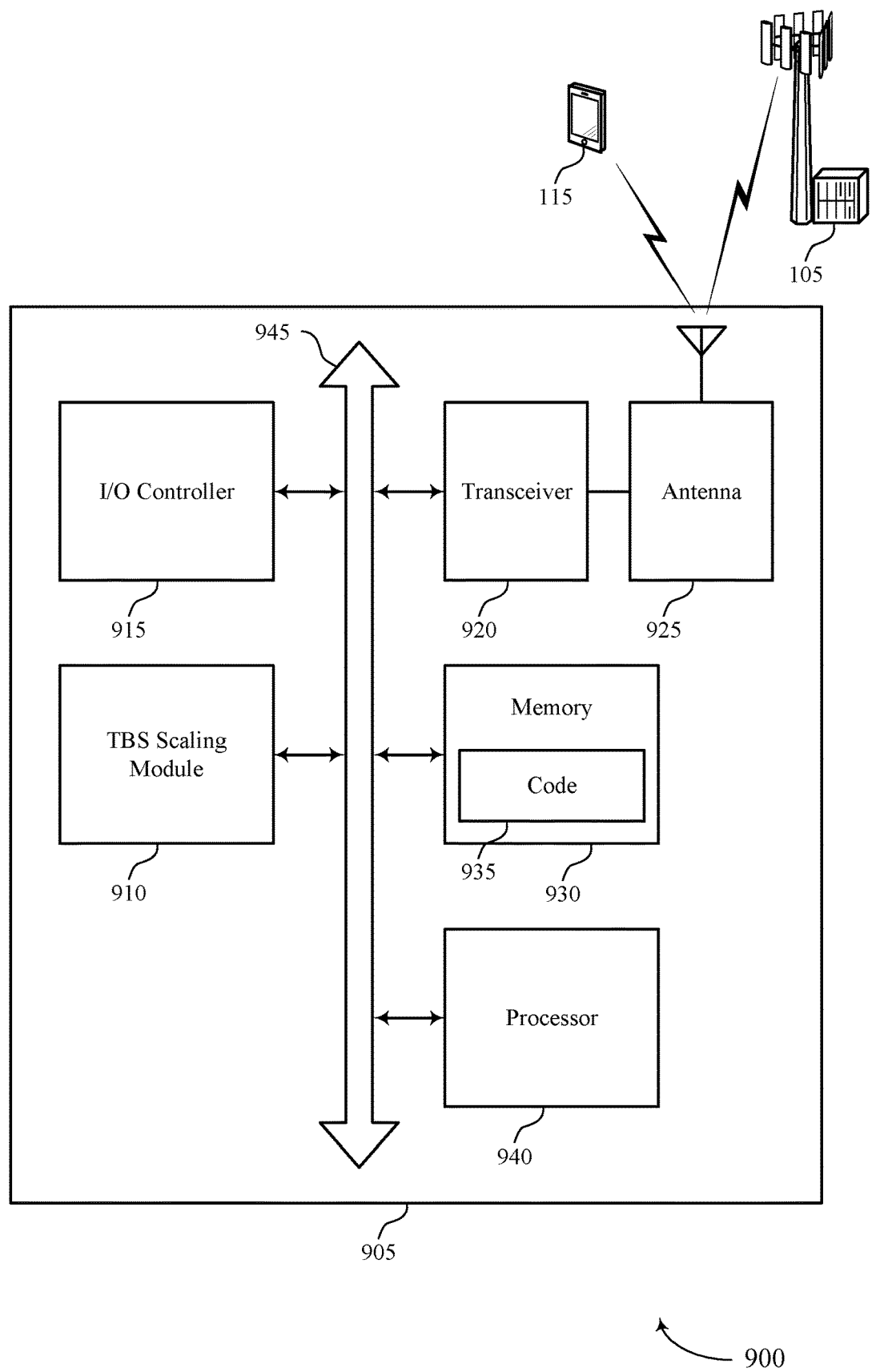
FIG. 9 shows a diagram of a system including a device that supports TBS scaling factor indication for URLLC in accordance with aspects of the present disclosure.

FIG. 9 shows a diagram of a system 900 including a device 905 that supports TBS scaling factor indication for URLLC in accordance with aspects of the present disclosure. The device 905 may be an example of or include the components of device 605, device 705, or a UE 115 as described herein. The device 905 may include components for bi-directional voice and data communications including components for transmitting and receiving communications, including a TBS scaling module 910, an I/O controller 915, a transceiver 920, an antenna 925, memory 930, and a processor 940. These components may be in electronic communication via one or more buses (e.g., bus 945).

The TBS scaling module 910 may receive, from a base station, a UE-specific TBS scaling factor indicator via a downlink transmission, identify a TBS scaling factor based on the UE-specific TBS scaling factor indicator, determine a TBS for communication based on the identified TBS scaling factor, and communicate with the base station according to the determined TBS. Additionally or alternatively, the TBS scaling module 910 may receive, from a base station, a downlink transmission indicating a repetition mode of operation for the UE, determine a TBS scaling factor from a set of supported TBS scaling factors based on the repetition mode, determine a TBS for communication based on the determined TBS scaling factor, and communicate with the base station according to the determined TBS.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting TBS scaling factor indication for URLLC).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
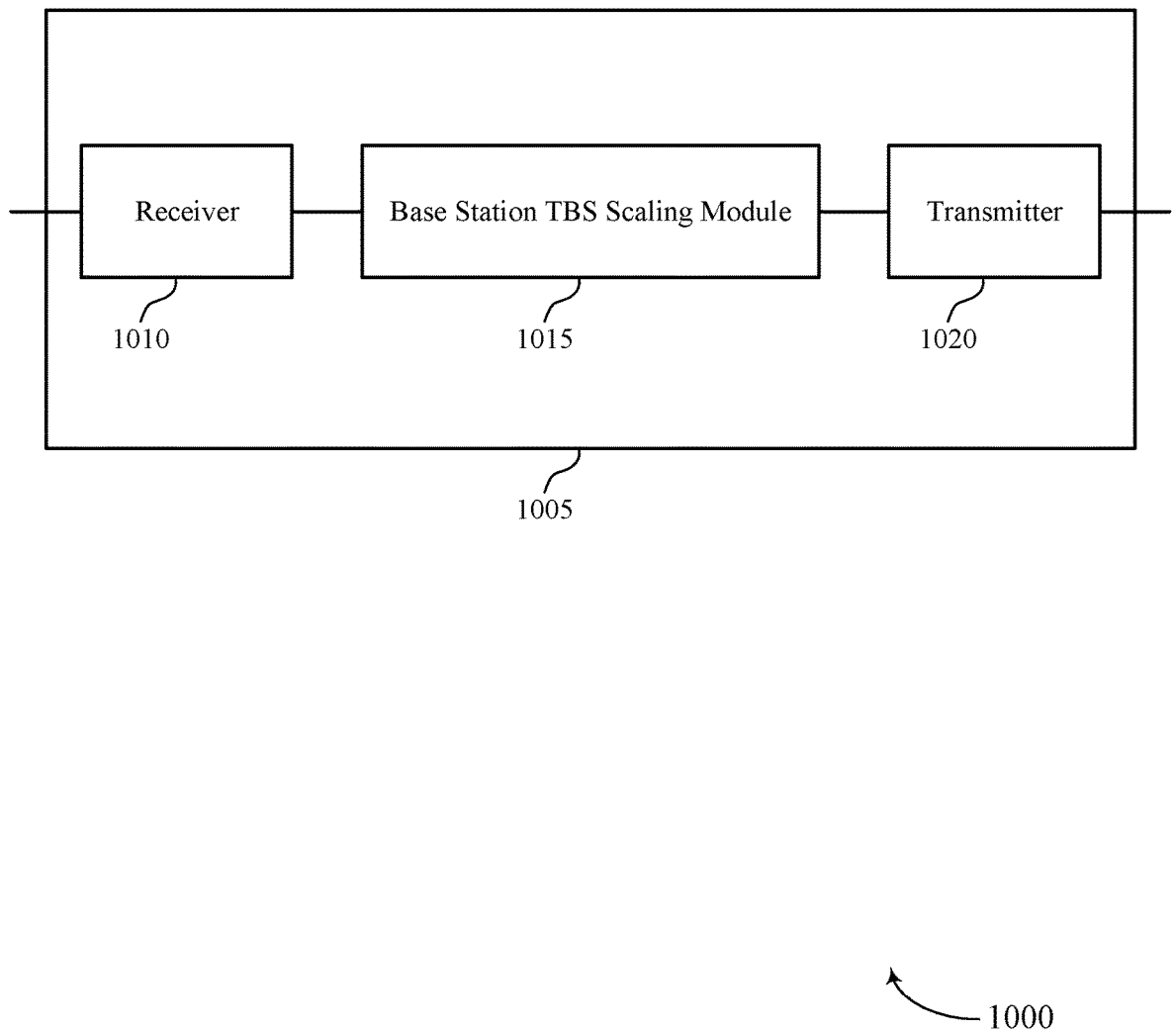
FIGS. 10 and 11 show block diagrams of devices that support TBS scaling factor indication for URLLC in accordance with aspects of the present disclosure.

FIG. 10 shows a block diagram 1000 of a device 1005 that supports TBS scaling factor indication for URLLC in accordance with aspects of the present disclosure. The device 1005 may be an example of aspects of a base station 105 as described herein. The device 1005 may include a receiver 1010, a TBS scaling module 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to TBS scaling factor indication, etc.). Information may be passed on to other components of the device 1005. The receiver 1010 may be an example of aspects of the transceiver 1320 described with reference to FIG. 13. The receiver 1010 may utilize a single antenna or a set of antennas.

In a first example, the TBS scaling module 1015 may select a TBS scaling factor for communication and may transmit, to a UE, a UE-specific TBS scaling factor indicator via a downlink transmission, the UE-specific TBS scaling factor indicator indicating the selected TBS scaling factor. The TBS scaling module 1015 may determine a TBS for communication based on the selected TBS scaling factor and may communicate with the UE according to the determined TBS.

In a second example, the TBS scaling module 1015 may transmit, to a UE, a downlink transmission indicating a repetition mode of operation for the UE, determine a TBS scaling factor from a set of supported TBS scaling factors based on the repetition mode, determine a TBS for communication based on the determined TBS scaling factor, and communicate with the UE according to the determined TBS. The TBS scaling module 1015 may be an example of aspects of the TBS scaling module 1310 described herein.

The TBS scaling module 1015, or its sub-components, may be implemented in hardware, code (e.g., software or firmware) executed by a processor, or any combination thereof. If implemented in code executed by a processor, the functions of the TBS scaling module 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The TBS scaling module 1015, or its sub-components, may be physically located at various positions, including being distributed such that portions of functions are implemented at different physical locations by one or more physical components. In some examples, the TBS scaling module 1015, or its sub-components, may be a separate and distinct component in accordance with various aspects of the present disclosure. In some examples, the TBS scaling module 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
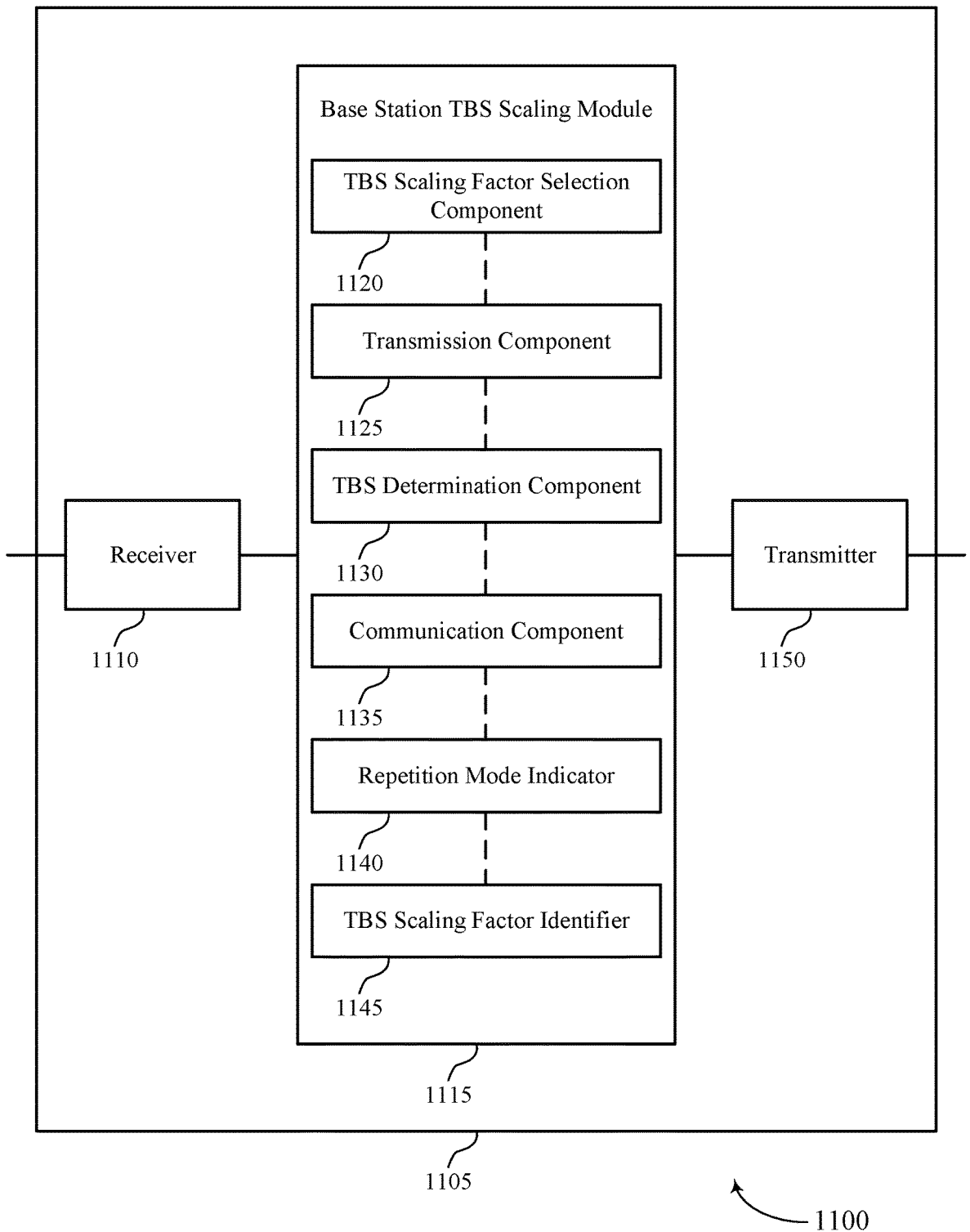

FIG. 11 shows a block diagram 1100 of a device 1105 that supports TBS scaling factor indication for URLLC in accordance with aspects of the present disclosure. The device 1105 may be an example of aspects of a device 1005 or a base station 105 as described herein. The device 1105 may include a receiver 1110, a TBS scaling module 1115, and a transmitter 1150. The device 1105 may also include a processor. Each of these components may be in communication with one another (e.g., via one or more buses).

The receiver 1110 may receive information such as packets, user data, or control information associated with various information channels (e.g., control channels, data channels, and information related to TBS scaling factor indication, etc.). Information may be passed on to other components of the device 1105. The receiver 1110 may be an example of aspects of the transceiver 1320 described with reference to FIG. 13. The receiver 1110 may utilize a single antenna or a set of antennas.

The TBS scaling module 1115 may be an example of aspects of the TBS scaling module 1015 as described herein. The TBS scaling module 1115 may include a TBS scaling factor selection component 1120, a transmission component 1125, a TBS determination component 1130, a communication component 1135, a repetition mode indicator 1140, and a TBS scaling factor identifier 1145. The TBS scaling module 1115 may be an example of aspects of the TBS scaling module 1310 described herein.

In some cases, the TBS scaling factor selection component 1120 may select a TBS scaling factor for communication. The transmission component 1125 may transmit, to a UE, a UE-specific TBS scaling factor indicator via a downlink transmission, the UE-specific TBS scaling factor indicator indicating the selected TBS scaling factor. The TBS determination component 1130 may determine a TBS for communication based on the selected TBS scaling factor. The communication component 1135 may communicate with the UE according to the determined TBS.

Additionally or alternatively, the repetition mode indicator 1140 may transmit, to a UE, a downlink transmission indicating a repetition mode of operation for the UE. The TBS scaling factor identifier 1145 may determine a TBS scaling factor from a set of supported TBS scaling factors based on the repetition mode. The TBS determination component 1130 may determine a TBS for communication based on the determined TBS scaling factor. The communication component 1135 may communicate with the UE according to the determined TBS.

The transmitter 1150 may transmit signals generated by other components of the device 1105. In some examples, the transmitter 1150 may be collocated with a receiver 1110 in a transceiver module. For example, the transmitter 1150 may be an example of aspects of the transceiver 1320 described with reference to FIG. 13. The transmitter 1150 may utilize a single antenna or a set of antennas.

Figure 12:
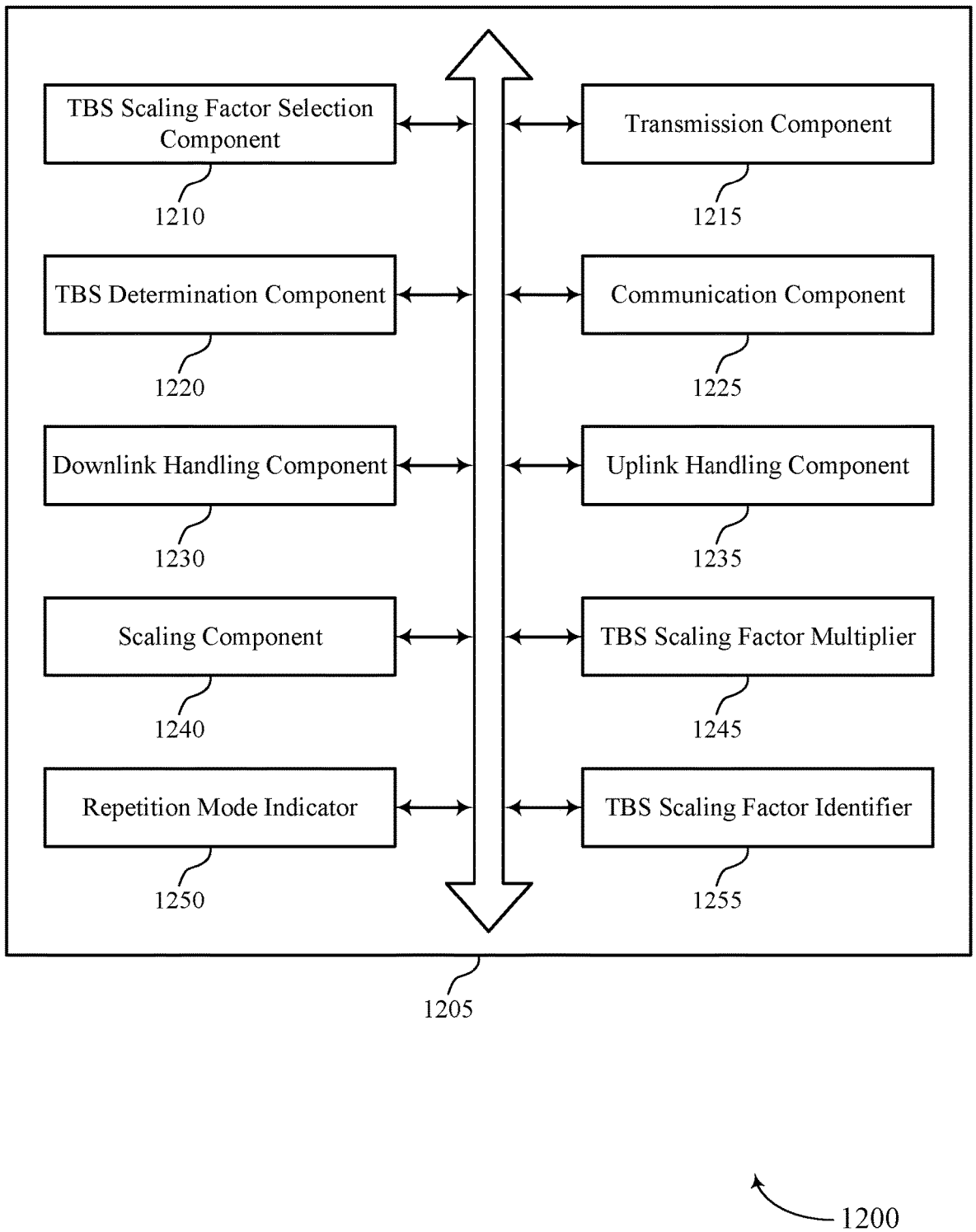
FIG. 12 shows a block diagram of a TBS scaling module that supports TBS scaling factor indication for URLLC in accordance with aspects of the present disclosure.

FIG. 12 shows a block diagram 1200 of a TBS scaling module 1205 that supports TBS scaling factor indication for URLLC in accordance with aspects of the present disclosure. The TBS scaling module 1205 may be an example of aspects of a TBS scaling module 1015, a TBS scaling module 1115, or a TBS scaling module 1310 described herein. The TBS scaling module 1205 may include a TBS scaling factor selection component 1210, a transmission component 1215, a TBS determination component 1220, a communication component 1225, a downlink handling component 1230, an uplink handling component 1235, a scaling component 1240, a TBS scaling factor multiplier 1245, a repetition mode indicator 1250, and a TBS scaling factor identifier 1255. Each of these modules may communicate, directly or indirectly, with one another (e.g., via one or more buses).

The TBS scaling factor selection component 1210 may select a TBS scaling factor for communication. In some examples, the TBS scaling factor selection component 1210 may select the TBS scaling factor based on a mode of operation for the UE, a TTI length for communication, a threshold coding rate, a threshold BLER, a reliability threshold, or a combination thereof. In some cases, the selected TBS scaling factor includes an uplink-specific TBS scaling factor, a downlink-specific TBS scaling factor, a shared TBS scaling factor for both uplink and downlink, or a combination thereof. In some cases, the selected TBS scaling factor is less than a resource scaling factor for communication.

In a first example, the transmission component 1215 may transmit, to a UE, a UE-specific TBS scaling factor indicator via a downlink transmission, the UE-specific TBS scaling factor indicator indicating the selected TBS scaling factor. In some cases, the UE-specific TBS scaling factor indicator is transmitted based on the mode of operation for the UE. In some examples, the transmission component 1215 may transmit one or more bits indicating the selected TBS scaling factor from a set of supported TBS scaling factors. In some cases, each of the set of supported TBS scaling factors is associated with a different TTI length for communication.

In a second example, the repetition mode indicator 1250 may transmit, to the UE, a downlink transmission indicating a repetition mode of operation for the UE. In some cases, the repetition mode is associated with URLLC or high priority operation. In some examples, the repetition mode indicator 1250 may indicate that the repetition mode is associated with URLLC operation based on a DCI format, a radio network temporary identifier (RNTI) indicated in a DCI transmission, a CRC masking format, or a combination thereof. In some cases, the repetition mode for the UE includes an MCS table for the UE to use for communication. In some cases, the repetition mode for the UE includes a BLER target for CSI reporting.

The TBS determination component 1220 may determine a TBS for communication. In the first example, the TBS determination component 1220 may determine the TBS for communication based on the selected TBS scaling factor. In the second example, the TBS scaling factor identifier 1255 may determine a TBS scaling factor from a set of supported TBS scaling factors based on the repetition mode. In some examples, the TBS scaling factor identifier 1255 may determine the TBS scaling factor based on a repetition factor for the repetition mode. In some cases, the determined TBS scaling factor is less than a supported TBS scaling factor corresponding to eMBB or low priority operation. The TBS determination component 1220 may determine the TBS for communication based on the determined TBS scaling factor.

The communication component 1225 may communicate with the UE according to the determined TBS.

The downlink handling component 1230 may transmit a DCI transmission, the DCI transmission including the UE-specific TBS scaling factor indicator and an indication of a number of PDSCH transmission repetitions for a repetition window. In some examples, the downlink handling component 1230 may transmit a set of repeated PDSCH transmissions within the repetition window, where a TBS of each PDSCH transmission of the set of repeated PDSCH transmissions is equal to the determined TBS for communication.

The uplink handling component 1235 may transmit a repetition-based SPS configuration message including the UE-specific TBS scaling factor indicator, an activation DCI transmission including the UE-specific TBS scaling factor indicator, or a combination thereof. In some examples, the uplink handling component 1235 may receive a set of repeated PUSCH transmissions according to an SPS configuration of the SPS configuration message, where a TBS of each PUSCH transmission of the set of repeated PUSCH transmissions is equal to the determined TBS for communication.

The scaling component 1240 may scale a legacy TBS value by the selected TBS scaling factor and may determine, from a table stored in memory, a closest valid TBS value to the scaled legacy TBS value, where the determined TBS for communication includes the determined closest valid TBS value.

In some cases, the TBS scaling factor may be an additional TBS scaling factor. The TBS scaling factor multiplier 1245 may multiply the additional TBS scaling factor by a legacy TBS scaling factor, an sTTI TBS scaling factor, or both to obtain a total TBS scaling factor, where the TBS for communication is determined based on the total TBS scaling factor.

Figure 13:
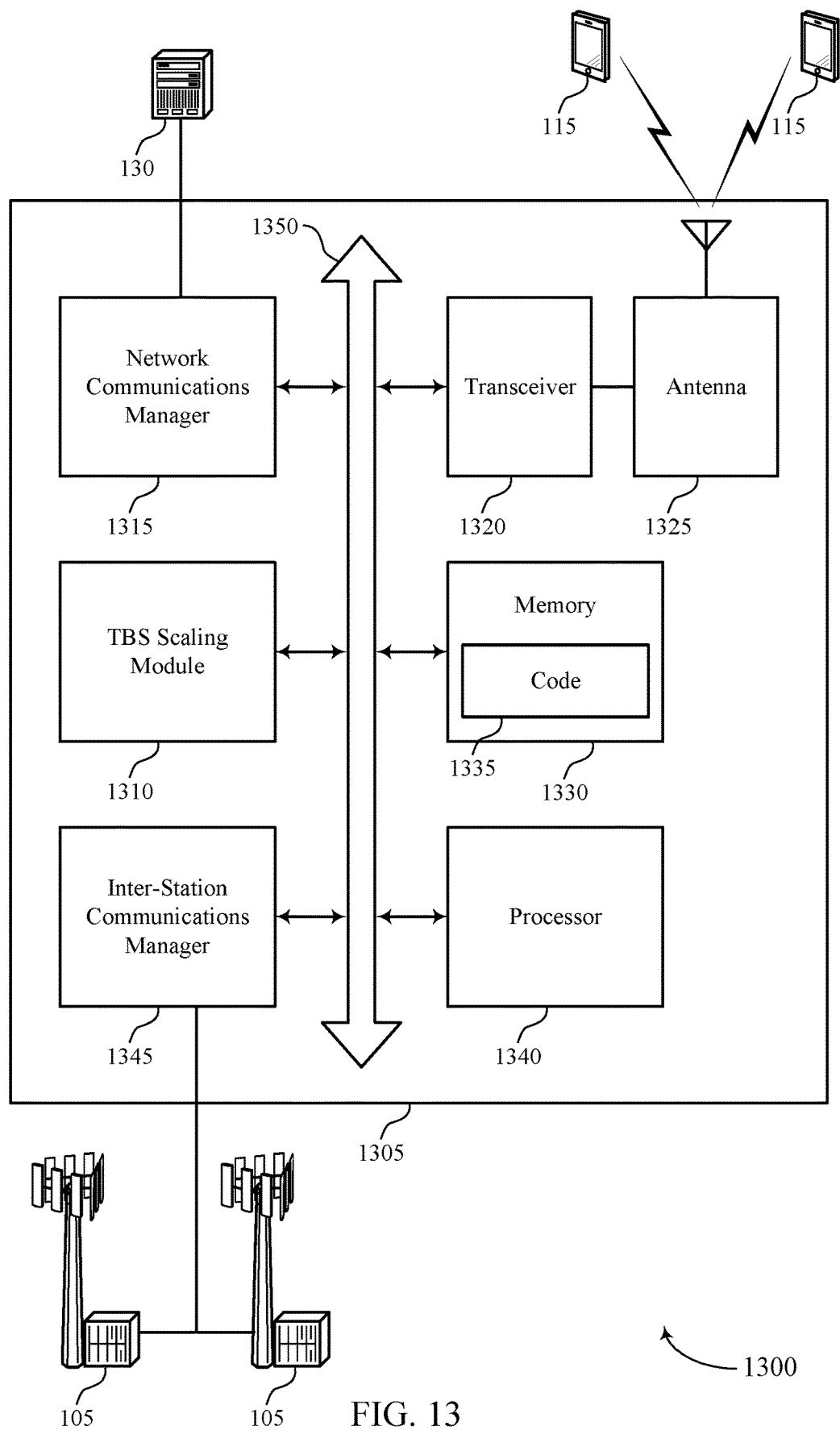
FIG. 13 shows a diagram of a system including a device that supports TBS scaling factor indication for URLLC in accordance with aspects of the present disclosure.

FIG. 13 shows a diagram of a system 1300 including a device 1305 that supports TBS scaling factor indication for URLLC in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a TBS scaling module 1310, a network communications manager 1315, a transceiver 1320, an antenna 1325, memory 1330, a processor 1340, and an inter-station communications manager 1345. These components may be in electronic communication via one or more buses (e.g., bus 1350).

The TBS scaling module 1310 may select a TBS scaling factor for communication, transmit, to a UE, a UE-specific TBS scaling factor indicator via a downlink transmission, the UE-specific TBS scaling factor indicator indicating the selected TBS scaling factor, determine a TBS for communication based on the selected TBS scaling factor, and communicate with the UE according to the determined TBS. Additionally or alternatively, the TBS scaling module 1310 may also transmit, to a UE, a downlink transmission indicating a repetition mode of operation for the UE, determine a TBS scaling factor from a set of supported TBS scaling factors based on the repetition mode, determine a TBS for communication based on the determined TBS scaling factor, and communicate with the UE according to the determined TBS.

The network communications manager 1315 may manage communications with the core network 130 (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device #{device} to perform various functions (e.g., functions or tasks supporting TBS scaling factor indication for URLLC).

The inter-station communications manager 1345 may manage communications with other base station 105 and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
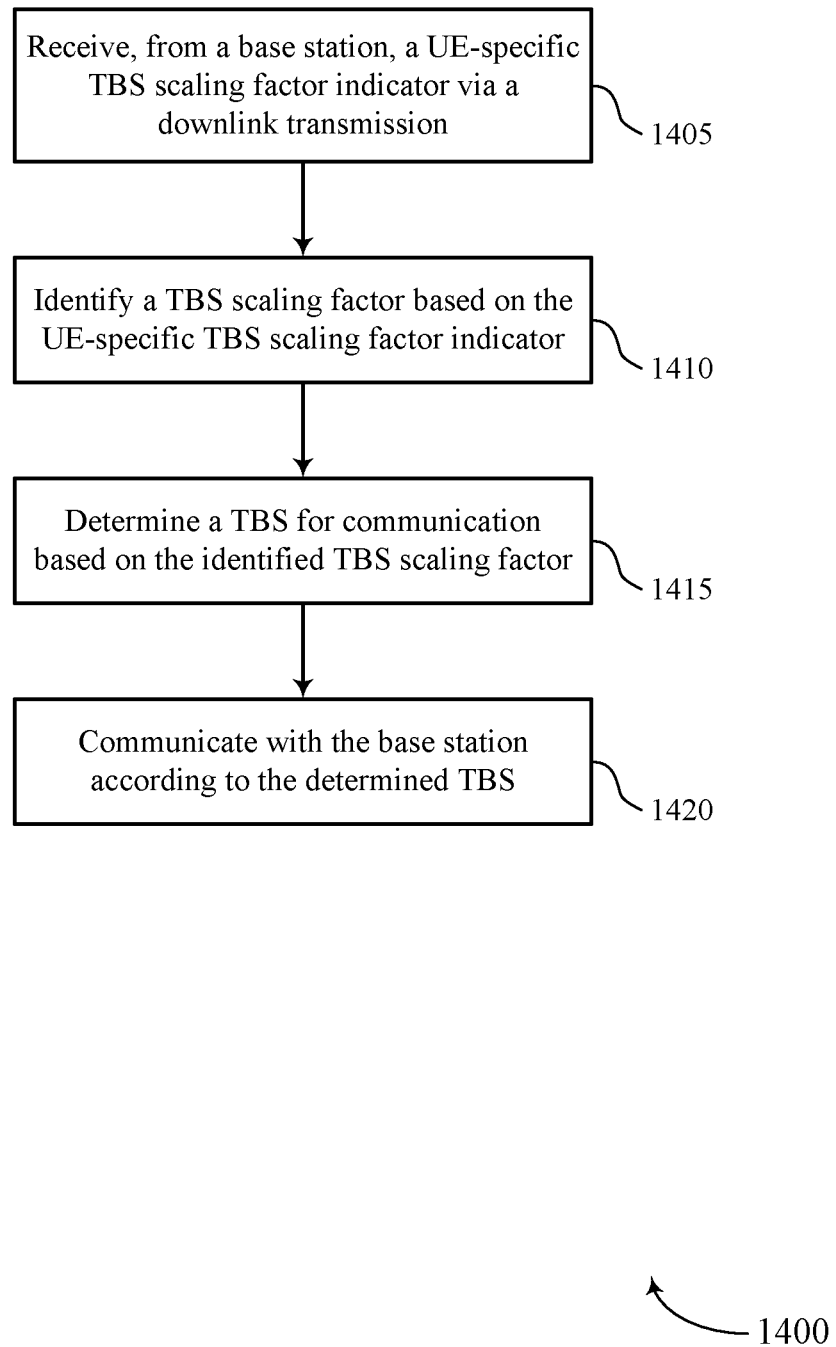
FIGS. 14 through 18 show flowcharts illustrating methods that support TBS scaling factor indication for URLLC in accordance with aspects of the present disclosure.

FIG. 14 shows a flowchart illustrating a method 1400 that supports TBS scaling factor indication for URLLC in accordance with aspects of the present disclosure. The operations of method 1400 may be implemented by a UE 115 or its components as described herein. For example, the operations of method 1400 may be performed by a TBS scaling module as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive, from a base station, a UE-specific TBS scaling factor indicator via a downlink transmission. The operations of 1405 may be performed according to the methods described herein. In some examples, aspects of the operations of 1405 may be performed by a reception component as described with reference to FIGS. 6 through 9.

At 1410, the UE may identify a TBS scaling factor based on the UE-specific TBS scaling factor indicator. The operations of 1410 may be performed according to the methods described herein. In some examples, aspects of the operations of 1410 may be performed by a TBS scaling factor identifier as described with reference to FIGS. 6 through 9.

At 1415, the UE may determine a TBS for communication based on the identified TBS scaling factor. The operations of 1415 may be performed according to the methods described herein. In some examples, aspects of the operations of 1415 may be performed by a TBS determination component as described with reference to FIGS. 6 through 9.

At 1420, the UE may communicate with the base station according to the determined TBS. The operations of 1420 may be performed according to the methods described herein. In some examples, aspects of the operations of 1420 may be performed by a communication component as described with reference to FIGS. 6 through 9.

Figure 15:
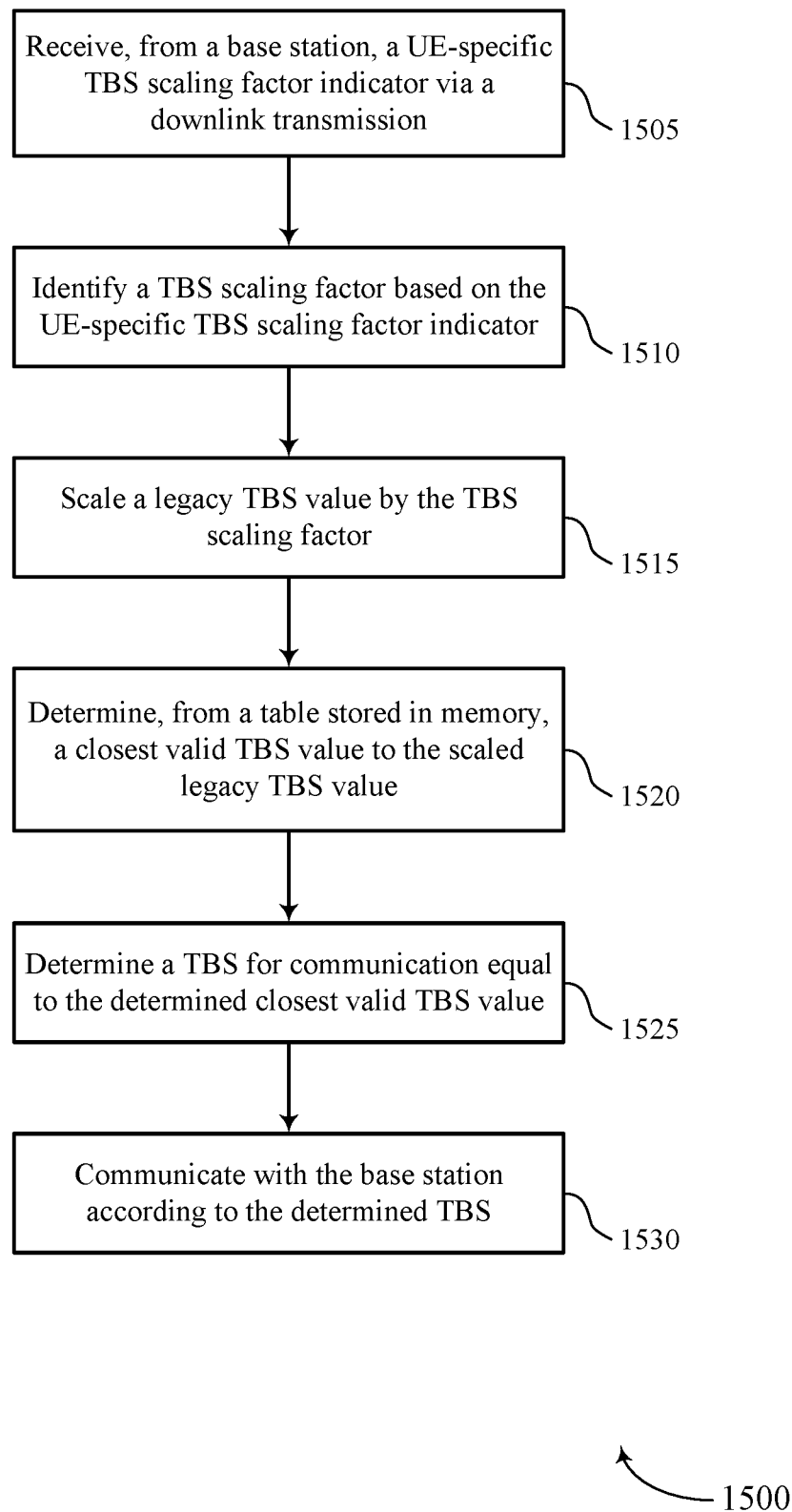

FIG. 15 shows a flowchart illustrating a method 1500 that supports TBS scaling factor indication for URLLC in accordance with aspects of the present disclosure. The operations of method 1500 may be implemented by a UE 115 or its components as described herein. For example, the operations of method 1500 may be performed by a TBS scaling module as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, a UE-specific TBS scaling factor indicator via a downlink transmission. The operations of 1505 may be performed according to the methods described herein. In some examples, aspects of the operations of 1505 may be performed by a reception component as described with reference to FIGS. 6 through 9.

At 1510, the UE may identify a TBS scaling factor based on the UE-specific TBS scaling factor indicator. The operations of 1510 may be performed according to the methods described herein. In some examples, aspects of the operations of 1510 may be performed by a TBS scaling factor identifier as described with reference to FIGS. 6 through 9.

At 1515, the UE may scale a legacy TBS value by the TBS scaling factor. The operations of 1515 may be performed according to the methods described herein. In some examples, aspects of the operations of 1515 may be performed by a scaling component as described with reference to FIGS. 6 through 9.

At 1520, the UE may determine, from a table stored in memory, a closest valid TBS value to the scaled legacy TBS value. The operations of 1520 may be performed according to the methods described herein. In some examples, aspects of the operations of 1520 may be performed by a scaling component as described with reference to FIGS. 6 through 9.

At 1525, the UE may determine a TBS for communication equal to the determined closest valid TBS value. The operations of 1525 may be performed according to the methods described herein. In some examples, aspects of the operations of 1525 may be performed by a TBS determination component as described with reference to FIGS. 6 through 9.

At 1530, the UE may communicate with the base station according to the determined TBS. The operations of 1530 may be performed according to the methods described herein. In some examples, aspects of the operations of 1530 may be performed by a communication component as described with reference to FIGS. 6 through 9.

Figure 16:
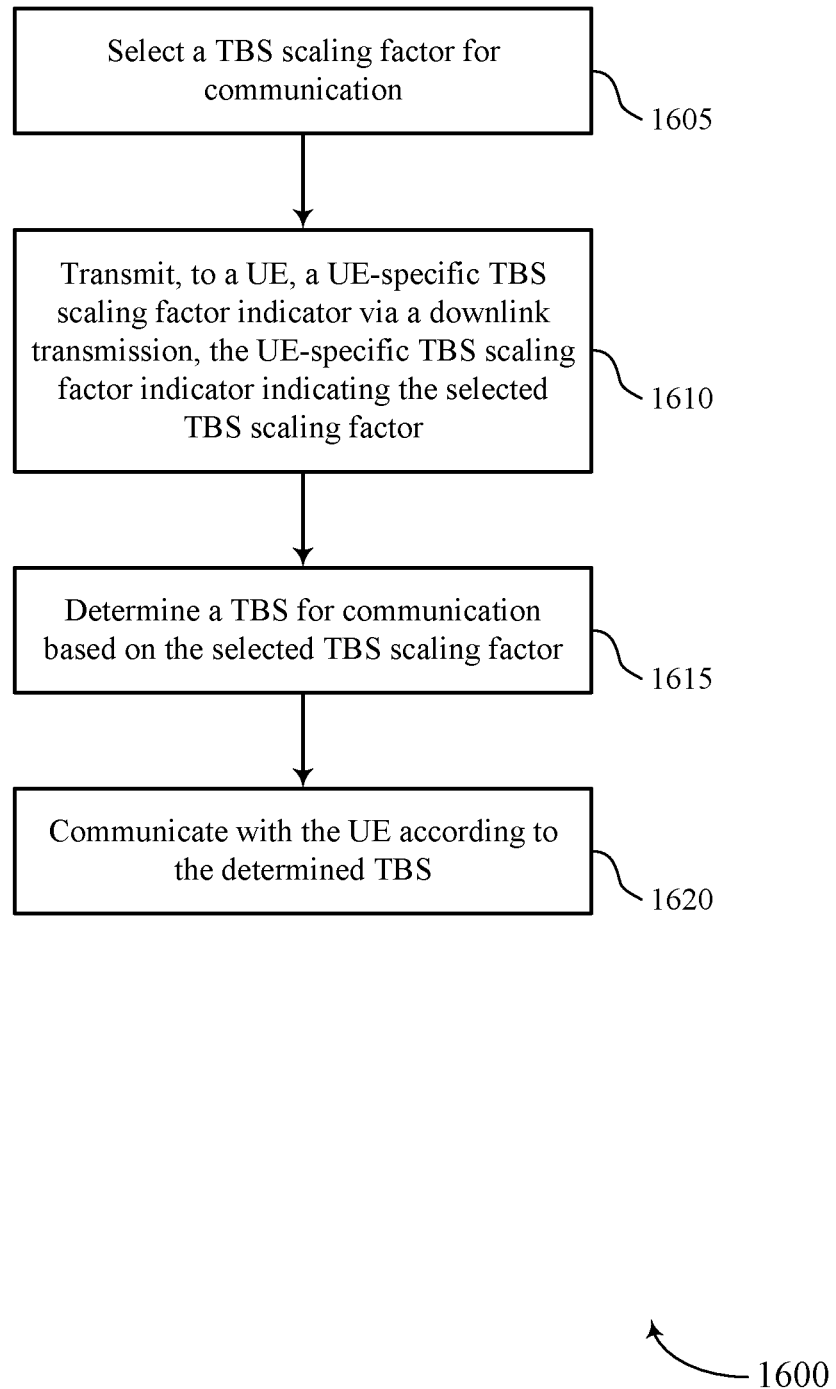

FIG. 16 shows a flowchart illustrating a method 1600 that supports TBS scaling factor indication for URLLC in accordance with aspects of the present disclosure. The operations of method 1600 may be implemented by a base station 105 or its components as described herein. For example, the operations of method 1600 may be performed by a TBS scaling module as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1605, the base station may select a TBS scaling factor for communication. The operations of 1605 may be performed according to the methods described herein. In some examples, aspects of the operations of 1605 may be performed by a TBS scaling factor selection component as described with reference to FIGS. 10 through 13.

At 1610, the base station may transmit, to a UE, a UE-specific TBS scaling factor indicator via a downlink transmission, the UE-specific TBS scaling factor indicator indicating the selected TBS scaling factor. The operations of 1610 may be performed according to the methods described herein. In some examples, aspects of the operations of 1610 may be performed by a transmission component as described with reference to FIGS. 10 through 13.

At 1615, the base station may determine a TBS for communication based on the selected TBS scaling factor. The operations of 1615 may be performed according to the methods described herein. In some examples, aspects of the operations of 1615 may be performed by a TBS determination component as described with reference to FIGS. 10 through 13.

At 1620, the base station may communicate with the UE according to the determined TBS. The operations of 1620 may be performed according to the methods described herein. In some examples, aspects of the operations of 1620 may be performed by a communication component as described with reference to FIGS. 10 through 13.

Figure 17:
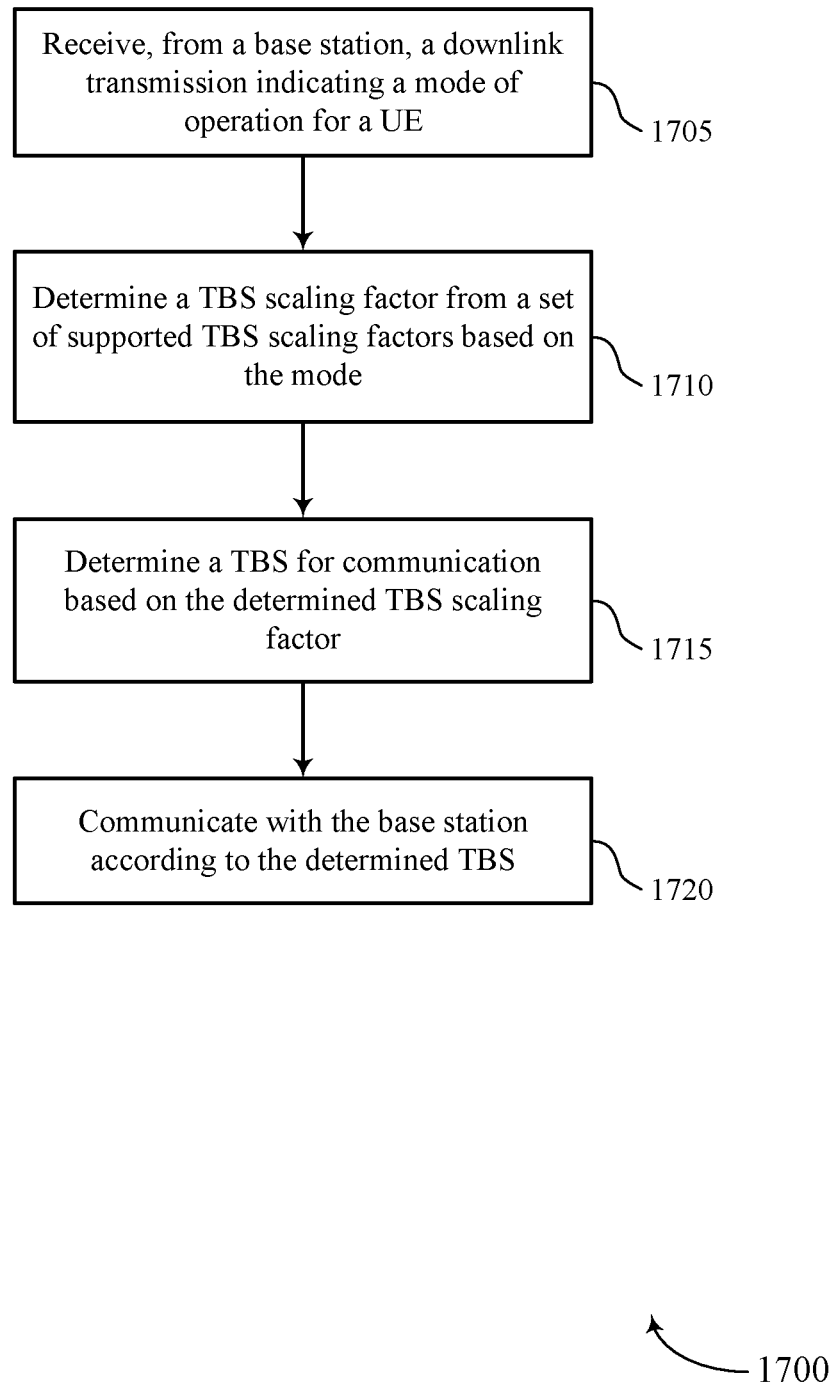

FIG. 17 shows a flowchart illustrating a method 1700 that supports TBS scaling factor indication for URLLC in accordance with aspects of the present disclosure. The operations of method 1700 may be implemented by a UE 115 or its components as described herein. For example, the operations of method 1700 may be performed by a TBS scaling module as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may receive, from a base station, a downlink transmission indicating a mode of operation for the UE. In some examples, the mode of operation for the UE is a repetition mode of operation. The operations of 1705 may be performed according to the methods described herein. In some examples, aspects of the operations of 1705 may be performed by a repetition mode identifier as described with reference to FIGS. 6 through 9.

At 1710, the UE may determine a TBS scaling factor from a set of supported TBS scaling factors based on the mode (and, in some cases, a TBS scaling indicator). The operations of 1710 may be performed according to the methods described herein. In some examples, aspects of the operations of 1710 may be performed by a TBS scaling factor identifier as described with reference to FIGS. 6 through 9.

At 1715, the UE may determine a TBS for communication based on the determined TBS scaling factor. The operations of 1715 may be performed according to the methods described herein. In some examples, aspects of the operations of 1715 may be performed by a TBS determination component as described with reference to FIGS. 6 through 9.

At 1720, the UE may communicate with the base station according to the determined TBS. The operations of 1720 may be performed according to the methods described herein. In some examples, aspects of the operations of 1720 may be performed by a communication component as described with reference to FIGS. 6 through 9.

Figure 18:
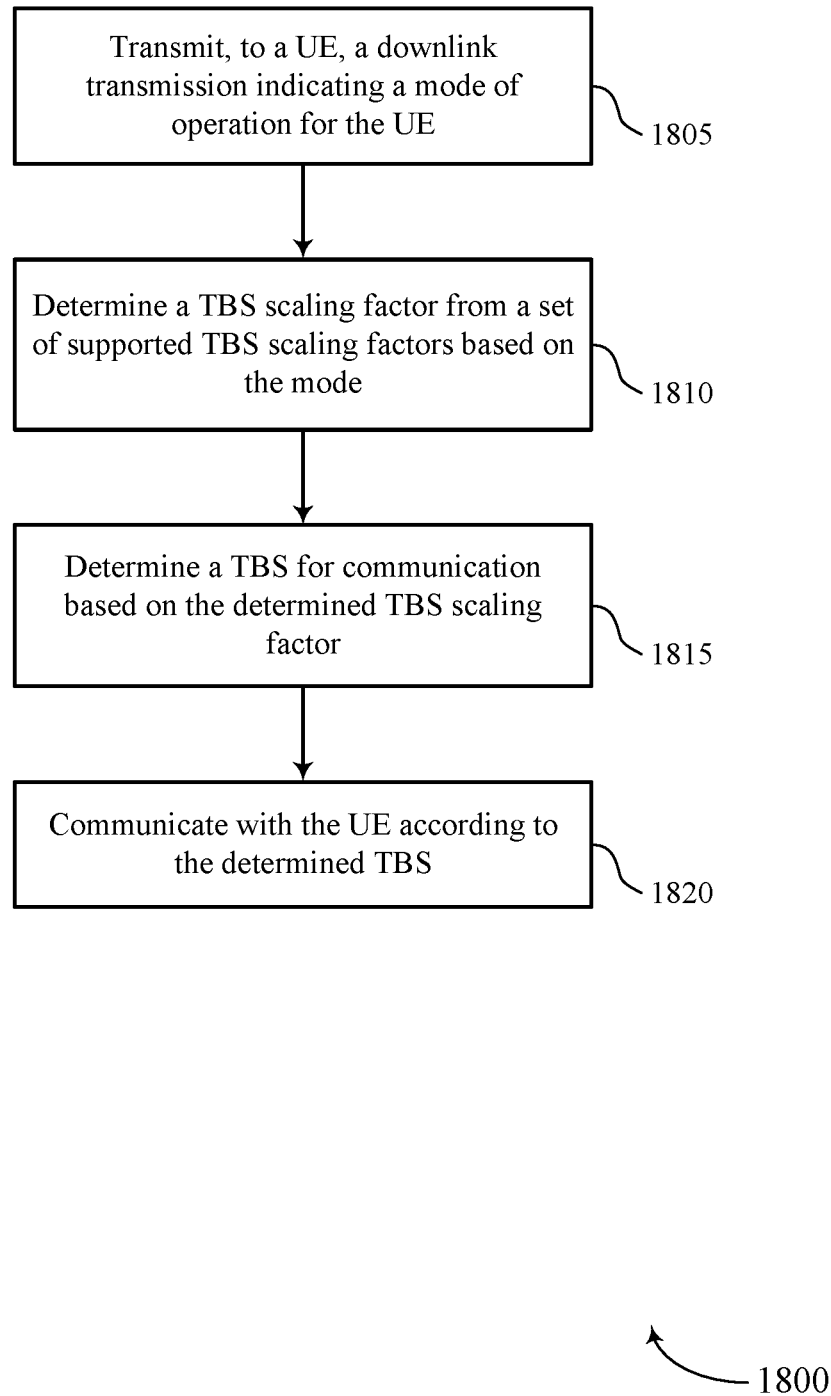

FIG. 18 shows a flowchart illustrating a method 1800 that supports TBS scaling factor indication for URLLC in accordance with aspects of the present disclosure. The operations of method 1800 may be implemented by a base station 105 or its components as described herein. For example, the operations of method 1800 may be performed by a TBS scaling module as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may transmit, to a UE, a downlink transmission indicating a mode of operation for the UE. In some examples, the mode of operation is a repetition mode of operation. The operations of 1805 may be performed according to the methods described herein. In some examples, aspects of the operations of 1805 may be performed by a repetition mode indicator as described with reference to FIGS. 10 through 13.

At 1810, the base station may determine a TBS scaling factor from a set of supported TBS scaling factors based on the mode. The operations of 1810 may be performed according to the methods described herein. In some examples, aspects of the operations of 1810 may be performed by a TBS scaling factor identifier as described with reference to FIGS. 10 through 13.

At 1815, the base station may determine a TBS for communication based on the determined TBS scaling factor. The operations of 1815 may be performed according to the methods described herein. In some examples, aspects of the operations of 1815 may be performed by a TBS determination component as described with reference to FIGS. 10 through 13.

At 1820, the base station may communicate with the UE according to the determined TBS. The operations of 1820 may be performed according to the methods described herein. In some examples, aspects of the operations of 1820 may be performed by a communication component as described with reference to FIGS. 10 through 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple CCs.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving, from a base station, an indication configuring the UE with a repetition mode of operation;
   receiving, from the base station, a UE-specific transport block size (TBS) scaling factor indicator via a downlink transmission;
   identifying a TBS scaling factor according to the UE-specific TBS scaling factor indicator based at least in part on the UE being configured with the repetition mode of operation;
   determining a TBS for communication based at least in part on the identified TBS scaling factor; and
   communicating with the base station according to the determined TBS.

2. The method of claim 1, wherein the indication configuring the UE with the repetition mode of operation is received via the downlink transmission.

3. The method of claim 1, wherein receiving the UE-specific TBS scaling factor indicator comprises:
   receiving one or more bits indicating the TBS scaling factor from a plurality of supported TBS scaling factors.

4. The method of claim 3, wherein each of the plurality of supported TBS scaling factors is associated with a different transmission time interval (TTI) length for communication.

5. The method of claim 1, wherein receiving the UE-specific TBS scaling factor indicator via the downlink transmission comprises:
   receiving a radio resource control (RRC) configuration message comprising the UE-specific TBS scaling factor indicator, a repetition-based semi-persistent scheduling (SPS) configuration message comprising the UE-specific TBS scaling factor indicator, an activation downlink control information (DCI) transmission comprising the UE-specific TBS scaling factor indicator, or a combination thereof.

6. The method of claim 5, wherein communicating with the base station according to the determined TBS comprises:
   transmitting a set of repeated physical uplink shared channel (PUSCH) transmissions according to an SPS configuration, wherein a TBS of each PUSCH transmission of the set of repeated PUSCH transmissions is equal to the determined TBS for communication.

7. The method of claim 1, wherein receiving the UE-specific TBS scaling factor indicator via the downlink transmission comprises:
   receiving a downlink control information (DCI) transmission, the DCI transmission comprising the UE-specific TBS scaling factor indicator and an indication of a number of physical downlink shared channel (PDSCH) transmission repetitions for a repetition window.

8. The method of claim 7, wherein communicating with the base station according to the determined TBS comprises:
   receiving a set of repeated PDSCH transmissions within the repetition window, wherein a TBS of each PDSCH transmission of the set of repeated PDSCH transmissions is equal to the determined TBS for communication.

9. The method of claim 1, wherein determining the TBS for communication comprises:
   scaling a legacy TBS value by the TBS scaling factor; and
   determining, from a table stored in memory, a closest valid TBS value to the scaled legacy TBS value, wherein the determined TBS for communication comprises the determined closest valid TBS value.

10. The method of claim 1, wherein the UE-specific TBS scaling factor indicator comprises an uplink-specific TBS scaling factor indicator, a downlink-specific TBS scaling factor indicator, a shared TBS scaling factor indicator for both uplink and downlink, or a combination thereof.

11. The method of claim 1, wherein the TBS scaling factor is less than a resource scaling factor for communication.

12. A method for wireless communications at a base station, comprising:
- transmitting, to a user equipment (UE), an indication configuring the UE with a repetition mode of operation;
- selecting a transport block size (TBS) scaling factor for communication based at least in part on the repetition mode of operation;
- transmitting, to the UE, a UE-specific TBS scaling factor indicator via a downlink transmission, the UE-specific TBS scaling factor indicator indicating the selected TBS scaling factor based at least in part on the UE being configured with the repetition mode of operation;
- determining a TBS for communication based at least in part on the selected TBS scaling factor; and
- communicating with the UE according to the determined TBS.

13. The method of claim 12, wherein transmitting the UE-specific TBS scaling factor indicator comprises:
- transmitting one or more bits indicating the selected TBS scaling factor from a plurality of supported TBS scaling factors.

14. The method of claim 13, wherein each of the plurality of supported TBS scaling factors is associated with a different transmission time interval (TTI) length for communication.

15. The method of claim 12, wherein transmitting the UE-specific TBS scaling factor indicator via the downlink transmission comprises:
- transmitting a radio resource control (RRC) configuration message comprising the UE-specific TBS scaling factor indicator, a repetition-based semi-persistent scheduling (SPS) configuration message comprising the UE-specific TBS scaling factor indicator, an activation downlink control information (DCI) transmission comprising the UE-specific TBS scaling factor indicator, or a combination thereof.

16. The method of claim 15, wherein communicating with the UE according to the determined TBS comprises:
- receiving a set of repeated physical uplink shared channel (PUSCH) transmissions according to an SPS configuration, wherein a TBS of each PUSCH transmission of the set of repeated PUSCH transmissions is equal to the determined TBS for communication.

17. The method of claim 12, wherein transmitting the UE-specific TBS scaling factor indicator via the downlink transmission comprises:
- transmitting a downlink control information (DCI) transmission, the DCI transmission comprising the UE-specific TBS scaling factor indicator and an indication of a number of physical downlink shared channel (PDSCH) transmission repetitions for a repetition window.

18. The method of claim 17, wherein communicating with the UE according to the determined TBS comprises:
- transmitting a set of repeated PDSCH transmissions within the repetition window, wherein a TBS of each PDSCH transmission of the set of repeated PDSCH transmissions is equal to the determined TBS for communication.

19. The method of claim 12, wherein determining the TBS for communication comprises:
- scaling a legacy TBS value by the selected TBS scaling factor; and
- determining, from a table stored in memory, a closest valid TBS value to the scaled legacy TBS value, wherein the determined TBS for communication comprises the determined closest valid TBS value.

20. The method of claim 12, wherein the selected TBS scaling factor comprises an uplink-specific TBS scaling factor, a downlink-specific TBS scaling factor, a shared TBS scaling factor for both uplink and downlink, or a combination thereof.

21. The method of claim 12, wherein the selected TBS scaling factor is less than a resource scaling factor for communication.

22. The method of claim 12, wherein selecting the TBS scaling factor comprises:
- selecting the TBS scaling factor based at least in part on a transmission time interval (TTI) length for communication, a threshold coding rate, a threshold block error rate (BLER), a reliability threshold, or a combination thereof.

23. An apparatus for wireless communications at a user equipment (UE), comprising:
- a processor;
- memory coupled with the processor; and
- instructions stored in the memory and executable by the processor to cause the apparatus to:
  - receive, from a base station, an indication configuring the UE with a repetition mode of operation;
  - receive, from the base station, a UE-specific transport block size (TBS) scaling factor indicator via a downlink transmission;
  - identify a TBS scaling factor according to the UE-specific TBS scaling factor indicator based at least in part on the UE being configured with the repetition mode of operation;
  - determine a TBS for communication based at least in part on the identified TBS scaling factor; and
  - communicate with the base station according to the determined TBS.

24. An apparatus for wireless communications at a base station, comprising:
- a processor;
- memory coupled with the processor; and
- instructions stored in the memory and executable by the processor to cause the apparatus to:
  - transmit, to a user equipment (UE), an indication configuring the UE with a repetition mode of operation;
  - select a transport block size (TBS) scaling factor for communication based at least in part on the repetition mode of operation;
  - transmit, to the UE, a UE-specific TBS scaling factor indicator via a downlink transmission, the UE-specific TBS scaling factor indicator indicating the selected TBS scaling factor based at least in part on the UE being configured with the repetition mode of operation;
  - determine a TBS for communication based at least in part on the selected TBS scaling factor; and
  - communicate with the UE according to the determined TBS.

* * * * *